United States Patent [19]
Kage et al.

[11] Patent Number: 5,379,168
[45] Date of Patent: Jan. 3, 1995

[54] TAPE RECORDER APPARATUS

[75] Inventors: Shingo Kage, Koube; Yasunari Toyama; Yoshikazu Yamano, both of Osaka, all of Japan

[73] Assignee: Matsushita Electric Industrial Co., Ltd., Osaka, Japan

[21] Appl. No.: 997,069

[22] Filed: Dec. 28, 1992

[51] Int. Cl.⁶ ........................ G11B 5/008; G11B 15/60
[52] U.S. Cl. ..................................... 360/96.5; 360/94
[58] Field of Search .................. 360/93, 94, 96.5, 96.6, 360/105, 132

[56] References Cited

U.S. PATENT DOCUMENTS

| | | | |
|---|---|---|---|
| 4,071,859 | 1/1978 | Sami | 360/105 |
| 4,561,031 | 12/1985 | Tanabe | 360/96.5 |
| 5,105,320 | 4/1992 | Hayashi | 360/96.5 |
| 5,172,284 | 12/1992 | Ohshima | 360/94 |
| 5,179,481 | 1/1993 | Kunze | 360/96.5 |
| 5,231,553 | 7/1993 | Weber et al. | 360/96.5 |
| 5,237,479 | 8/1993 | Vollmann | 360/132 |

FOREIGN PATENT DOCUMENTS

| | | |
|---|---|---|
| 0080317 | 6/1983 | European Pat. Off. |
| 0434143 | 6/1991 | European Pat. Off. |
| 2637141 | 2/1977 | Germany |
| 3229894 | 3/1983 | Germany |
| 8805726 | 6/1988 | Germany |
| 3832672 | 3/1990 | Germany |
| 59-90253 | 5/1984 | Japan |

Primary Examiner—Stuart S. Levy
Assistant Examiner—Jefferson Evans
Attorney, Agent, or Firm—Lowe, Price, LeBlanc & Becker

[57] ABSTRACT

A tape recorder apparatus is compatible with both analog and digital audio tape cassettes 1, 2, upper surfaces of the cassettes being formed with different engaging holes 1a, 2a, respectively. This tape recorder apparatus includes a holder 3 for selectively receiving either of these two different kinds of tape cassettes 1, 2; and a retainer member 4 which is swingably supported about a shaft 4d and disposed adjacent to but spaced from the holder 3. This retainer member 4 has a pair of engaging hooks 4a, 4c disposed along an insertion direction of the tape cassette 1 or 2. Each of these engaging hooks 4a, 4c exclusively engages with either of different engaging holes 1a, 2a formed on the two different kinds of tape cassettes 1, 2 when a respective tape cassette 1 or 2 is completely inserted in the holder 3. This retainer member 4 further includes a resilient portion 4b for flexibly causing a swing movement of the engaging hooks 4a, 4c in both directions for engaging and disengaging with the tape cassettes 1 or 2. Shift members 5, 6 and 7, are connected with the retainer member 4 directly or indirectly, for shifting the tape cassette 1 or 2 from a first position, where the tape cassette is completely held in the holder 3, to a second position where the tape cassette is set to execute its recording or reproducing operation.

8 Claims, 14 Drawing Sheets

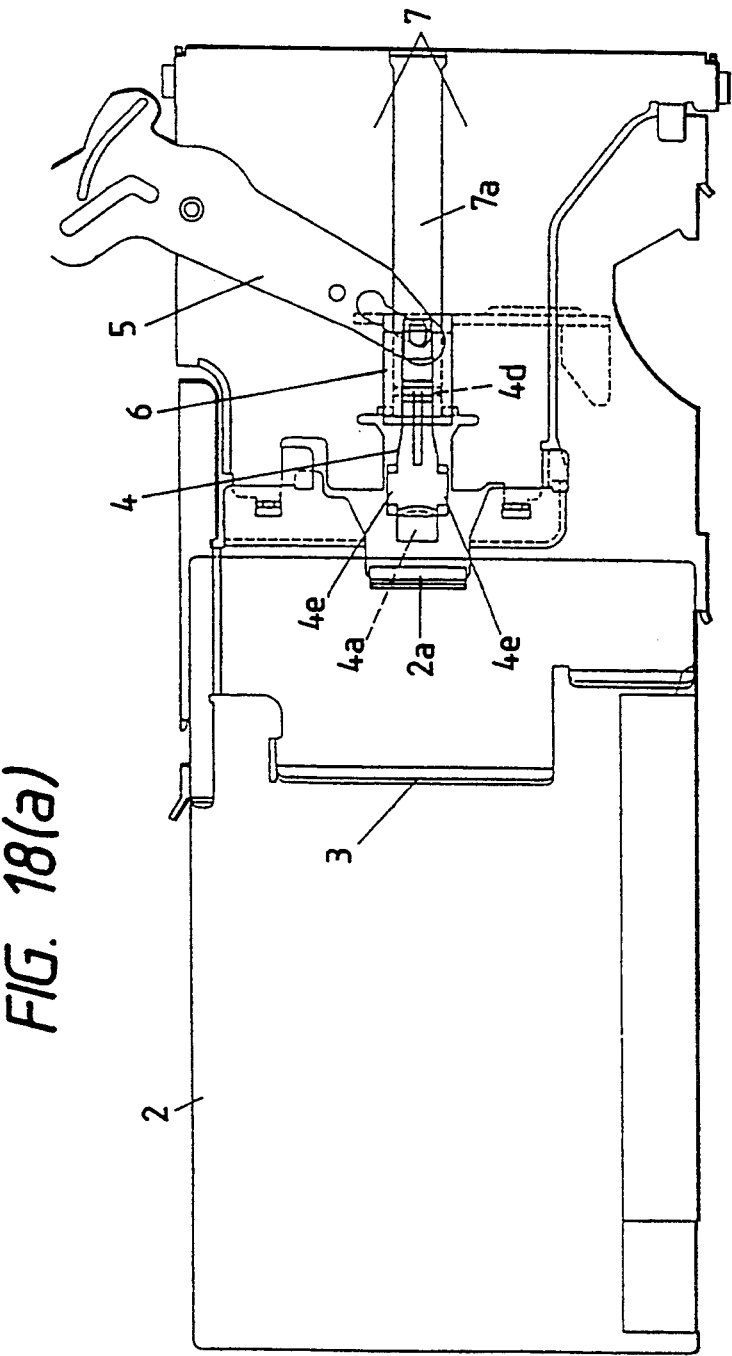
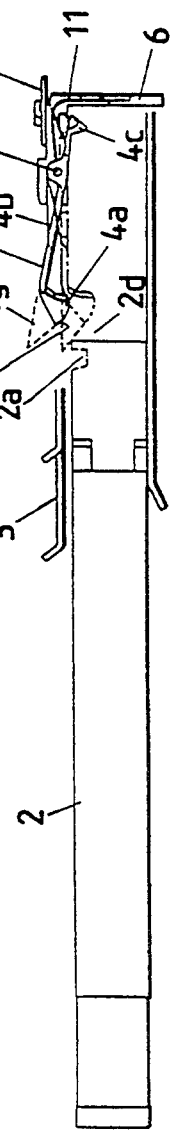
FIG. 18(a)
FIG. 18(b)

TAPE RECORDER APPARATUS

BACKGROUND OF THE INVENTION

1. Field of the Invention

The present invention relates to a tape recorder, equipped with a loading mechanism for a tape cassette, which is chiefly installed in an automotive vehicle as a car audio apparatus for is used as a stationary or a portable audio device in a home for recording and producing music and the like.

2. Description of the Related Art

Recent technical development in an audio-related field is characterized in that development of digital audio technology has been gradually intensified and digital audio systems have been expanding their share in the market, becoming competitive with analogue audio systems. An outstanding advantage of digital recording and reproducing technology is that it enables a tape recorder to realize the reproduction with high fidelity. Presently, there are two systems proposed, namely the R-DAT system having a rotary head and the S-DAT system having a stationary head.

The S-DAT system has a construction similar to that of an analogue tape recorder apparatus because it has a stationary-type magnetic head. Thus, the head and a tape cassette used for the S-DAT are both similar to those of the analogue tape recorder apparatus.

Accordingly, it is desirable to develop a new tape recorder apparatus compatible with either of these two different kinds of tape cassettes and a new tape recorder apparatus capable of recording or reproducing both analogue and digital signals is now expected soon in the market.

An analogue tape cassette, i.e., an analogue compact cassette (hereinafter, referred to as an ACC), has a configuration which is made thick at a front end opening portion which is constructed to house various components such as a magnetic head and pinch rollers and the like.

On the other hand, a digital tape cassette, i.e., a digital compact cassette (hereinafter, referred to as a DCC) is constructed to have a shutter slidably provided with respect to a front end opening portion which accommodates a magnetic head and pinch rollers and the like. This shutter is positioned in its home position to close this front end opening portion when this tape is not in use, and is slid widely toward either the same direction as a travelling direction of a tape or the opposite direction to open the front end opening portion when the digital tape is used.

A single tape recorder is proposed for realizing the recording and the reproducing of both analogue and digital signals. This proposed tape recorder is constituted to realize the loading of such different tape cassettes in the same tape recorder, namely one originally designed for a digital tape cassette equipped with a shutter.

The analogue tape recorder, however, also has a loading mechanism for the exclusive use of ACC. For effective utilization of such a loading mechanism, it is desirable to use this popular loading mechanism for the new tape recorder apparatus which is capable of recording and reproducing both analogue and digital audio signals.

A great amount of cost and time for the development and the manufacturing can be saved if the modification for fitting to both the analogue and digital tape cassettes can be done simply by a relatively minor change.

Furthermore, this has the advantage that the already existing production .Line #or mass-producing analogue loading mechanisms can be effectively utilized for producing the new compatible tape recorder capable of recording and reproducing with both ACC and DCC, as well as the analogue tape recorder exclusively used for the ACC.

One such analogue tape recorder apparatus is explained hereinafter with reference to FIG. 21 to 25.

FIG. 21 is a partial perspective plan view of the known analogue tape recorder apparatus. FIG. 22 is a side view of the same analogue tape recorder apparatus.

In the drawing is shown a tape cassette 31, and 32 represents a reel shaft insertion hole. Further, 33 represents a holder for holding the tape cassette 31. The holder 33 is constituted by a base plate having curled edges formed at the left end thereof. The base plate of the holder 33 is disposed in parallel with the insertion direction of the ACC tape cassette 31. The ACC tape cassette 31 is manually inserted into the holder 33 from the left along the arrow shown in FIG. 21.

34 denotes a retainer member for retaining the ACC tape cassette 31. This retainer member 34 is basically constituted by a hook 34a and an arm 34b. See FIG. 23. The hook 34a is positioned at the left end of the retainer member 34 and the arm 34b extends horizontally in a right-and-left direction. The hook 34a is formed in a wedge shape so as to be engaged in the reel shaft insertion hole 32. In more detail, the hook 34a is designed to extend downward into the holder 33, so that it abuts to the ACC tape cassette 31 when the ACC tape cassette 31 is inserted into the holder 33.

A shift member 35 is pivotally supported about its shaft, disposed at a rear edge of the tape recorder unit. The shift member 35 can cause a swing movement for shifting the ACC tape cassette 31. This shift member 35 is constituted by an arm member extending in a back-and-forth direction in parallel with the holder 33 inwardly, a slider member connected with the end of this arm member and disposed centrallyso as to slide in a right-and-left direction, and a guide member having an elongated groove for receiving the slide member.

This shift member 35 functions to load the manually inserted ACC tape cassette toward the right or, to the contrary, unloading this ACC tape cassette 31 toward the left. The ACC tape cassette 31 is thus shifted along the arrow shown in FIGS. 21 and 22 from a first position where the ACC tape cassette 31 is locked by the retainer member 34 to a second position where the ACC tape cassette 31 is placed to confront a head and pinch rollers so as to realize a recording or reproduction of the ACC tape.

Next, an operation of this analogue tape recorder is explained with reference to FIGS. 23 and 24.

As described above, retainer member 34 has hook 34a at the left end of the elongated arm 34b to engage with reel shaft insertion hole 32. The elongated arm 34b is made by a resilient material so as to flexibly bend in an up-and-down direction.

When the ACC tape cassette 31 is manually inserted in the holder 33, hook 34a of retainer 34 first hits the right edge of the ACC tape cassette 31. The resilient arm 34b is then bent by being pressed by the manual pushing force, and in turn the hook 34a rides on the upper surface 31a of the ACC tape cassette 31, as shown in FIG. 24(a).

If the ACC tape cassette 31 is pushed further inward from this condition, the reel shaft insertion hole 32 of the tape cassette 31 comes to the position where the hook 34a directly confronts this reel shaft insertion hole 32. Hook 34a then immediately engages with this reel shaft insertion hole 32 by the springback force of the resilient arm 34b. Thus, the ACC tape cassette 31 is held at a predetermined position, as shown in FIG. 24(b).

Thereafter, the ACC tape cassette 31 is shifted to the second position by the aid of the shift member 35.

As apparent from the above description, in accordance with this known analogue tape recorder apparatus, the retainer member 34 is made for only engaging with the same tape cassette, i.e., the ACC tape cassette 31, for the purpose of exclusive use for analogue tape cassettes.

However, at present, the digital tape cassette is not made in the same configuration as the analogue tape cassette. As shown, in FIGS. 25(a) and 25(b), the ACC 1 and the DCC 2 are of slightly different configuration in their thicknesses, the locations of their discrimination holes and the like.

In case of the ACC 1, there are provided a pair of reel shaft insertion holes 1a, 1a, each associated with a reel hub 1b serving for winding a magnetic tape. Furthermore, ACC 1 has a thick portion 1c, being made thick in a widthwise direction at a front end opening portion (not shown), which is constructed to house various components such as a magnetic head and pinch rollers and the like.

On the other hand, in the DCC 2, there is provided a grip slot 2a for gripping of the DCC 2 in the loading operation. Moreover, the DCC 2 is constructed to have a shutter 2b slidably provided to cover a front end opening portion (not shown) which accommodates a magnetic head and pinch rollers and the like. Though DCC 2 has a pair of reel hubs 2c, 2c, they are different from the reel hubs 1b, 1b of the ACC 1 in that the reel hubs 2c, 2c are not opened to the upper surface of the DCC 2, i.e., the reel hubs 2c, 2c are opened only toward the lower surface of the DCC 2 so as to couple with the reel shaft.

In this manner, the ACC 1 and the DCC 2 have basically the same overall configuration, but have slightly different configurations in their detailed structure.

Therefore, the analogue tape recorder apparatus that is exclusively used for the ACC tape cassette is not directly useable for the DCC tape cassette without modification.

SUMMARY OF THE INVENTION

Accordingly, the present invention has a principal object, in view of above-described problems or disadvantages, to provide a new tape recorder apparatus having a simple loading mechanism using a single retainer member, which is compatible with different kinds of tape cassettes such as an analogue tape cassette and a digital tape cassette.

In order to accomplish this and other related object, a first aspect of the present invention provides a tape recorder apparatus which is compatible with two different kinds of tape cassettes, each of said two different kinds of tape cassettes housing a magnetic tape being wound around a pair of reels, the upper surfaces of the two different kinds of tape cassettes being formed with respectively different engaging holes.

The tape recorder apparatus according the preferred embodiment includes a holder for selectively receiving either of said two different kinds of tape cassettes, and a retainer member being disposed adjacent to but spaced from said holder. This retainer member has a plurality of engaging hooks disposed along an insertion direction of the tape cassette. Each of these engaging hooks exclusively engages only with one kind of the different engaging holes formed on the two different kinds of tape cassettes when the respective tape cassette is completely inserted in the holder. The retainer member also includes a resilient portion for flexibly causing a swing movement of the plurality of engaging hooks in both directions for engaging and disengaging with said tape cassettes.

There is further provided a shift means, connected with the retainer member directly or indirectly, for shifting the tape cassette from a first position where the tape cassette is completely held in the holder to a second position where the tape cassette is set to execute its recording or reproducing operation.

Furthermore, in accordance with a second aspect of the present invention, the retainer member is positioned centrally on a line segment connecting positions of the different engaging holes on said two different kinds of tape cassettes when the cassette is completely held in the holder. The retainer member is swingably supported on a shaft disposed perpendicularly to the line segment and in parallel with the upper surface of the tape cassette held in the holder. Further note, a pair of engaging hooks are provided at opposite ends thereof so that these engaging hooks can respectively engage with the different engaging holes formed on the two different kinds of tape cassettes.

Still further, and in accordance with a third aspect of the present invention, the retainer member further includes a protruding piece formed in parallel with the shaft of the retainer member. And there is provided a guide member which does not interfere with the protruding piece in the first position but interferes with the protruding piece in the position other than the first position, so as to allow the protruding piece to shift only along a shifting direction by the aid of said shift means without causing any swing movement.

Yet further, in accordance with a fourth aspect of the present invention an urging means is provided for urging one of the plurality of engaging hooks so as to securely hold this engaging hook so as not to be disengaged from its corresponding engaging hole.

The above and other objects, features and advantage of the present invention will become more apparent from the following detailed description which is to be read in conjunction with the accompanying drawings.

BRIEF DESCRIPTION OF DRAWINGS

FIG. 18(a) is a plan view showing a tape recorder apparatus in accordance with a fourth embodiment of the present invention;

FIG. 18(b) is a side view showing the tape recorder apparatus in accordance with the fourth embodiment of the present invention;

DETAILED DESCRIPTION OF THE PREFERRED EMBODIMENTS

With reference to the accompanying drawings, the preferred embodiments of the present invention are explained in detail.

First Embodiment

A tape recorder apparatus in accordance with a first preferred embodiment of the present invention is explained with reference to FIGS. 1 to 5.

Figure 1:
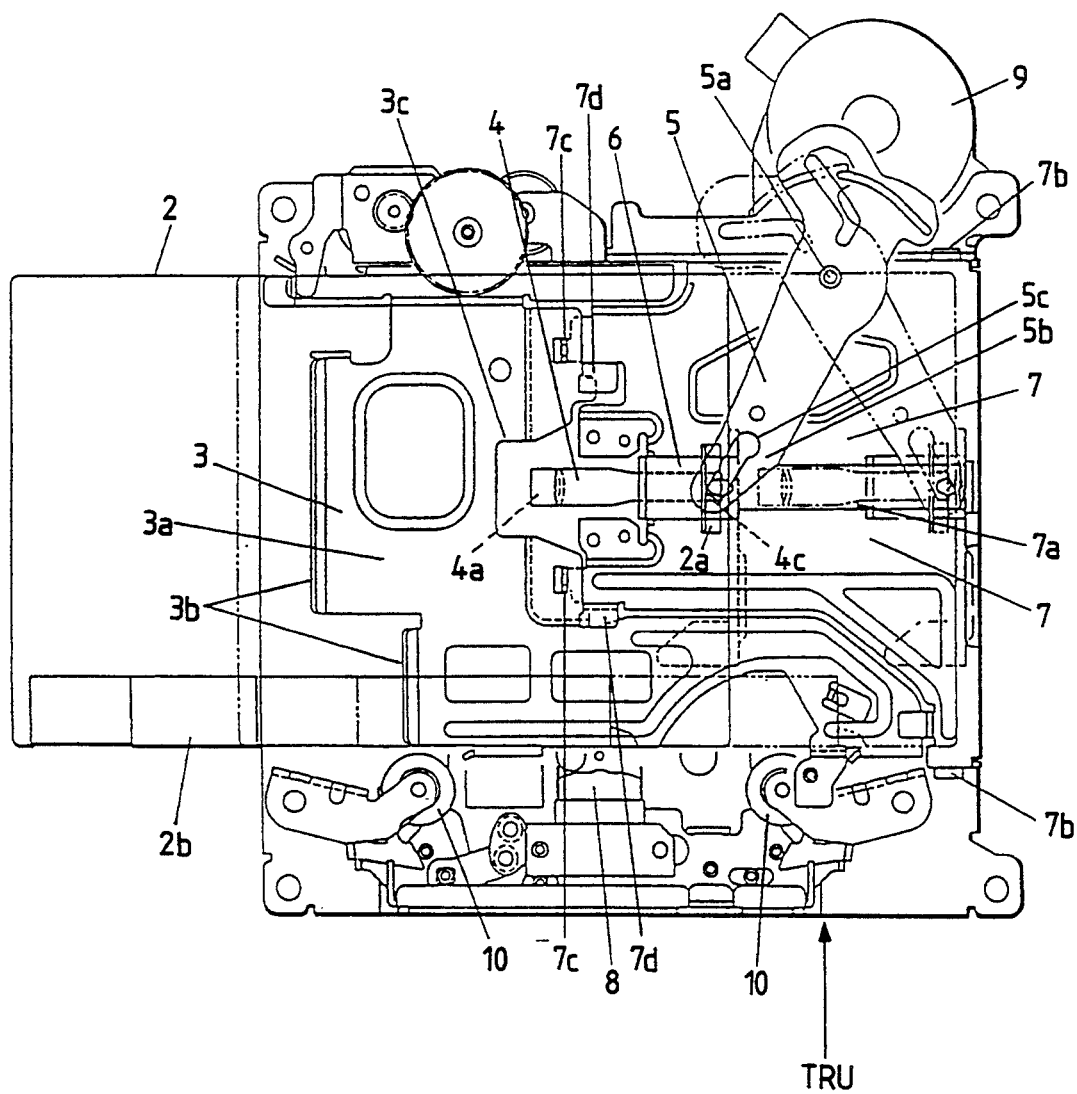
FIG. 1 is a plan view showing a tape recorder apparatus in accordance with a first preferred embodiment of the present invention.
Figure 2:
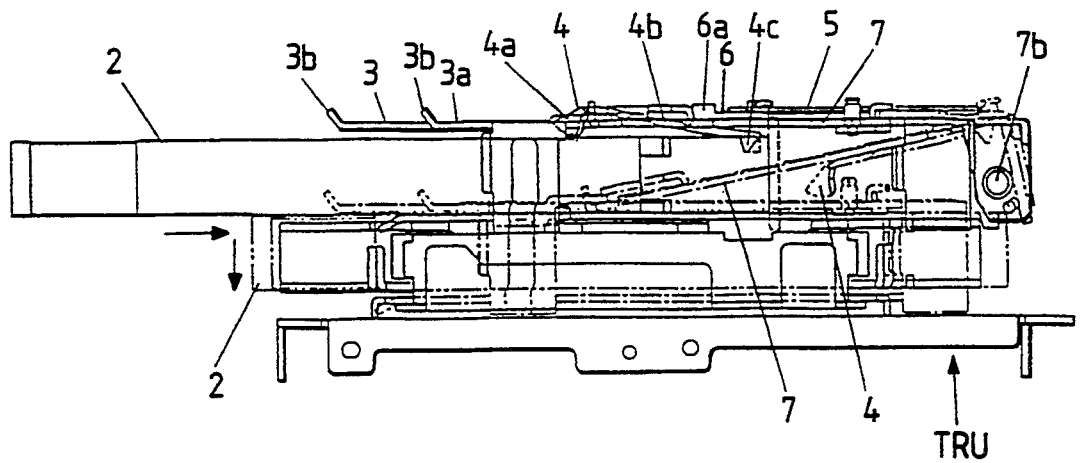
FIG. 2 is a side view showing the tape recorder apparatus in accordance with the first embodiment of the present invention.

The tape cassette useable in this embodiment can be either an ACC tape cassette 1 or a DCC tape cassette 2. In FIGS. 1 and 2, a DCC tape cassette 2 is disclosed as a representative of a tape cassette to be loaded.

The DCC tape cassette 2 is basically inserted into a holder 3 from the left side in the drawing. The DDA tape cassette 2 has a shutter 2b at its front open end portion. The holder 3 has an aperture at its left end so as to receive the tape cassette to be inserted, i.e., the DDC cassette 2 or the ACC tape cassette 1.

The holder 3 is constituted by a base plate 3a having curled edges 3b, 3b formed at the left end thereof. The curled edges 3b, 3b are provided for facilitating the insertion of the tape cassette 1 or 2 from the left edge. The centrally provided curled edge 3b is most extended toward the left. Furthermore, the holder member 3 has a cutaway portion 3c formed centrally at the right end thereof. This cutaway portion 3c is formed so as not to interfere with a retainer member 4, which is provided to hold one end (i.e., a right end in the drawing) of the tape cassette 1 or 2 when the tape cassette 1 or 2 is completely inserted in the holder 3.

Thus, the retainer member 4 is disposed adjacent to but spaced from the cutaway portion 3c of the holder 3.

The retainer member 4 is constituted by a first hook 4a, a resilient arm 4b, and a second hook 4c. The first hook 4a is provided at one end (i.e., a left end in the drawing) of the resilient arm 4b and the second hook 4c is provided at the other end (i.e., a right end in the drawing) of the resilient arm 4b.

An arm member 5 is pivotally supported about a shaft 5a, which is disposed at a rear edge of the tape recorder unit (TRU). The arm member 5 extends horizontally in parallel with the holder 3 inwardly so as to engage with a slider member 6 at a cantilever end 5b thereof. The slider member 6 is disposed centrally so as to slide in a right-and-left direction. The slider member 6 can thus slide along the insertion direction of the tape cassette.

An elongated hole 5c is formed in this cantilever end 5b in order to prevent these arm member 5 and the slider member 6 from interfering with each other when the arm member 5 causes an arc swing movement about the shaft 5a and the slider member 6 responsively causes a straight slide movement in the right-and-left direction.

Thus, a pin portion 6a integrally formed on the slider member 6 is inserted in this elongated hole 5c so that this pin portion 6a moves along the elongated hole 5c from one end to the other end, or vice versa, in response to the mutual and cooperative movement of the arm member 5 and the slider member 6. The retainer member 4 is fixedly connected to the left end of the slider member 6. Its detailed structure will be described later.

The arm member 5 and the slider member 6 cooperate to function as shift means for loading the tape cassette 1 or 2 manually inserted in the holder 3 toward the right or, to the contrary, for unloading this tape cassette 1 or 2 toward the left.

A guide member 7 also functions as the shift means, and is provided at right end of the tape recorder unit TRU. The guide member 7 is basically configured in an L-shaped plate-like configuration having a long horizontal upper plane and a short vertical right end wall. The horizontal upper plane is disposed in parallel with the holder 3, i.e., in parallel with the tape cassette insertion direction. The guide member 7 has a pair of hinges 7c, 7c at the left edge thereof, and a pair of twists 7d, 7d provided adjacent to the hinges 7c, 7c. These hinges 7c, 7c and twists 7d, 7d co-work to function as hinge portions for hingedly connecting the guide member 7 and the holder member 3.

Also, the guide member 7 is formed with an elongated groove 7a which is centrally-opened in the right-and-left direction. The slider member 6 can slidably engage with this elongated groove 7a of the guide member 7.

Figure 3:
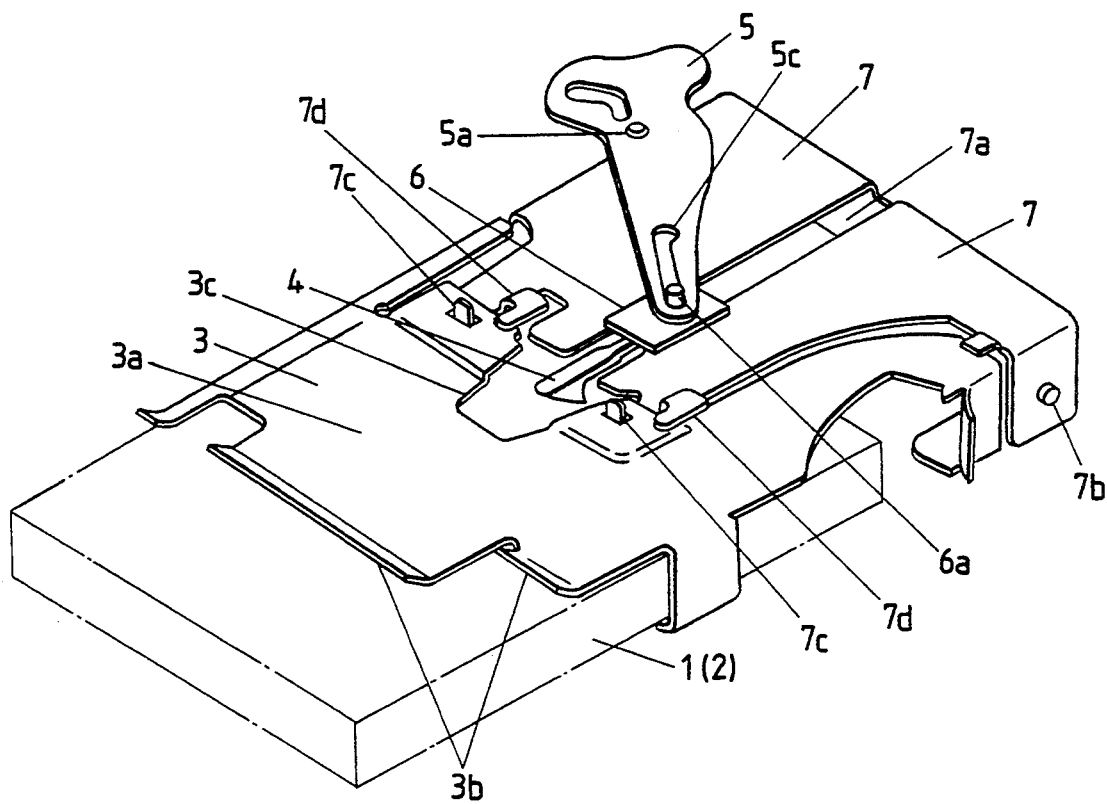
FIG. 3 is a perspective view showing an operational condition of the tape recorder apparatus in accordance with the first embodiment of the present invention, in a first position where a tape cassette is completely inserted in a holder.

Accordingly, as shown in FIG. 3, when the tape cassette 1 or 2 is inserted in the holder 3, it is first of all locked with the holder 3 by the hook of the retainer member 4 (its engaging condition will be described in more detail). This condition is referred to as a first position in the following explanation.

Figure 4:
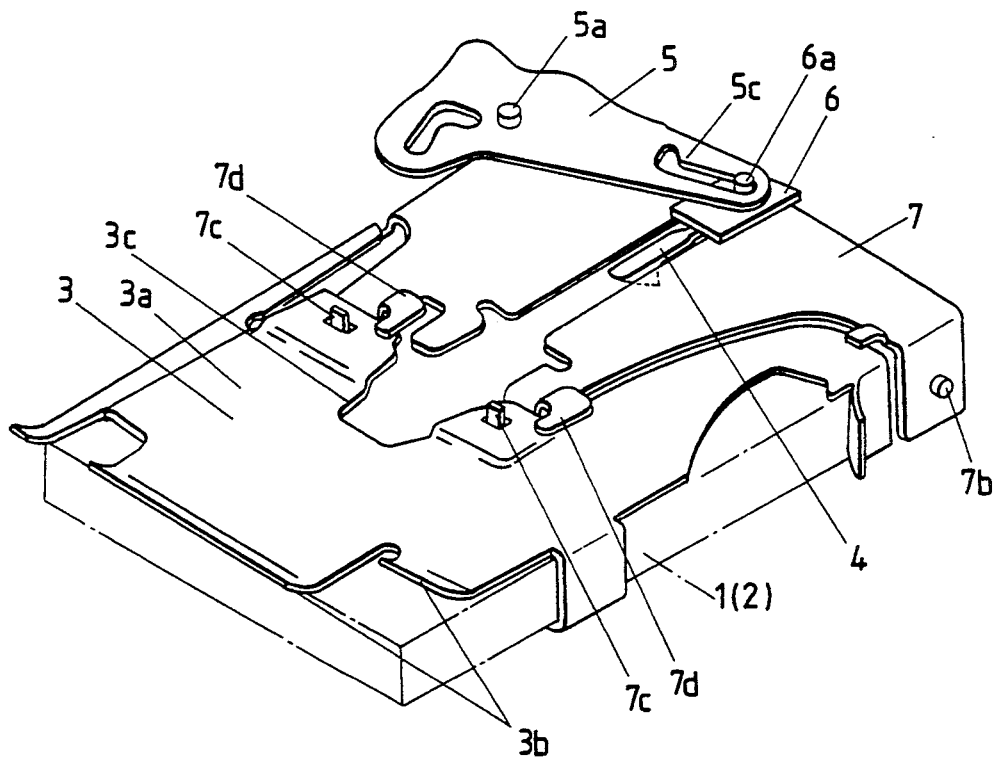
FIG. 4 is a perspective view showing another operational condition of the tape recorder apparatus in accordance with the first embodiment of the present invention, in an intermediate position where the tape cassette is shifted from the first position to the right end.

The, as the tape cassette 1 or 2 is further pushed inward (i.e. toward the right direction), this pushing force causes the shift means to guide the tape cassette 1 or 2 toward the right. Thus, the slider member 6 slides toward the right along the elongated groove 7a and the arm member 5 swings in a counterclockwise direction, until the tape cassette 1 or 2 slides in the holder 3 toward the right and is fully inserted to the right end thereof, as best seen in FIG. 4.

The guide member 7 is pivotally supported by a shaft 7b, which is provided at the right end of the tape recorder unit TRU. This shaft 7b is disposed to extend in a back-and-forth direction, so that the guide member 7 can cause a swing movement about this shaft 7b. Thus, after the tape cassette 1 or 2 is completely inserted until it reaches the right end, the guide member 7 causes its swing movement about the shaft 7b to lower its cantilevered left end. With this swing movement caused by the guide member 7 the holder 3 is also lowered.

Figure 5:
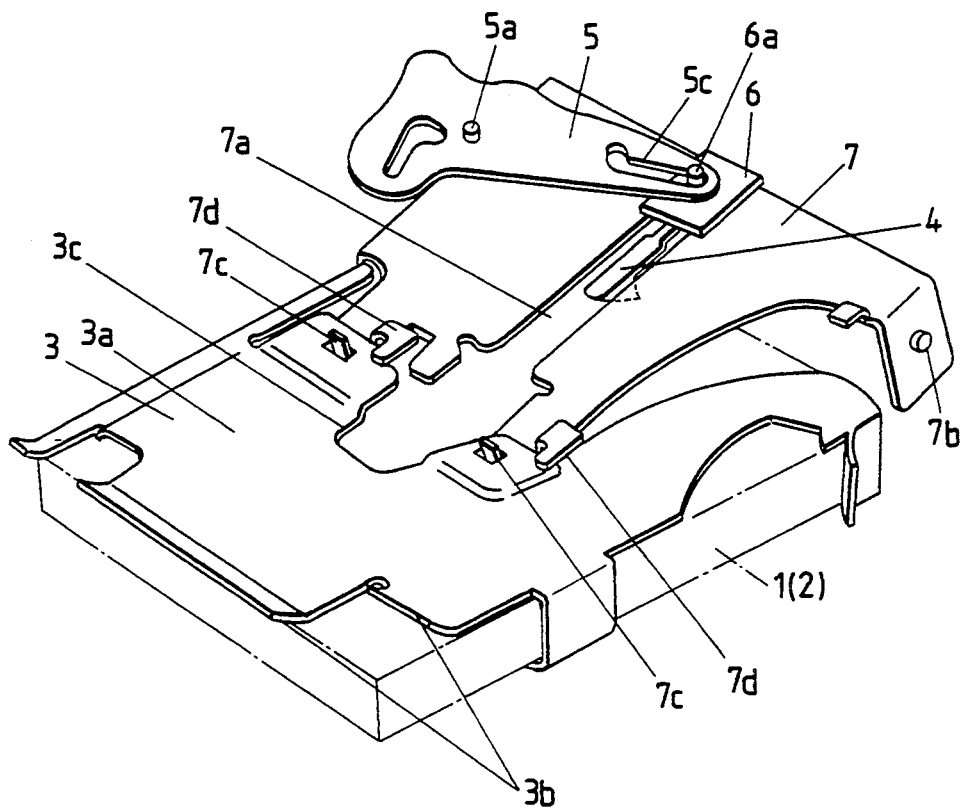
FIG. 5 is a perspective view showing still another operational condition of the tape recorder apparatus in accordance with the first embodiment of the present invention, in a second position where the tape cassette is set to execute its recording or reproducing operation.

As the holder 3 is hingedly connected with the cantilevered left end of the guide member 7, the holder 3 is directly lowered with keeping its horizontal condition, as shown in FIG. 5. Therefore, the tape cassette 1 or 2 is lowered directly downward together with the holder 3 at the right end position and then settled in a second position, where the tape cassette 1 or 2 confronts with a head or pinch rollers fixedly disposed at a front end portion of the tape recorder unit TRU so as to enable the recording or the reproducing operation.

For recording and reproduction operations, a magnetic head 8 is provided at a center of the front end portion of the tape recorder unit TRU. At right and left ends of the magnetic head 8, there are provided a pair of pinch rollers 10, 10.

A driving motor 9 is provided at a rear right end of the tape recorder unit TRU near the arm member 5.

This driving motor 9 functions to drive a capstan (not shown) to rotate. A tape in the cassette s separated into two winding parts wound around a pair of two reels, and a straight portion extending from one reel portion to the other reel portion is disposed at the front end opening portion of the tape cassette 1 or 2. The pinch roller 10 and the capstan are fundamentally disposed to sandwich this straight tape portion elongated in the front end opening portion of the tape cassette 1 or 2, so as to cooperatively transmit the driving force caused by the driving motor 9 to the tape.

The ACC tape cassette 1 has a pair of reel shaft insertion holes 1a, 1a. The hook 4a provided a left end of the resilient arm portion 4b is designed to just engage with one of these reel shaft insertion holes 1a, 1a so as to lock the ACC tape cassette 1 with the holder 3, i.e., when the ACC tape cassette 1 is positioned in the first position.

On the other hand, the DCC tape cassette 2 has a grip slot 2a which is recessed on a right end of its upper surface. The hook 4c provided at a right end of the resilient arm portion 4b is designed to just engage with this grip slot 2a so as to lock the DCC tape cassette 2 with the holder 3, when the DCC tape cassette 2 is inserted in the holder, i.e., when the DCC tape cassette 2 is positioned in the first position.

Furthermore, the hooks 4a and 4b are designed to extend downward into the holder 3, so that they abut to the tape cassette 1 or 2 when the tape cassette 1 or 2 is inserted into the holder 3.

An operation of the tape recorder constituted as described in the foregoing description is explained below, with reference to FIGS. 6 to 9.

Figure 6:
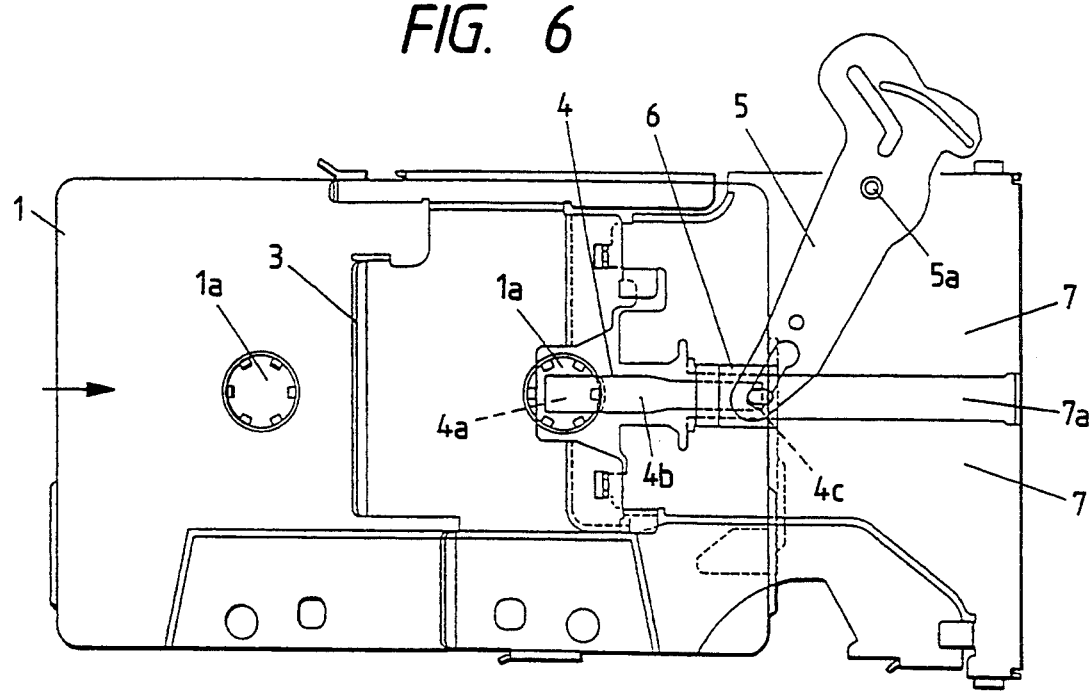
FIG. 6 is a plan view showing an operational condition wherein a first tape cassette (i.e., an analogue tape cassette) is used in the tape recorder apparatus in accordance with the first embodiment.
Figure 7A:
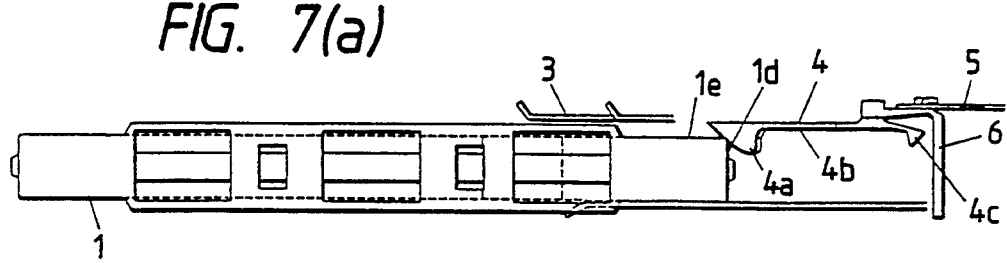
FIGS. 7(a) to 7(c) are side views respectively showing operational conditions of the above tape recorder apparatus per FIG. 6.
Figure 7B:
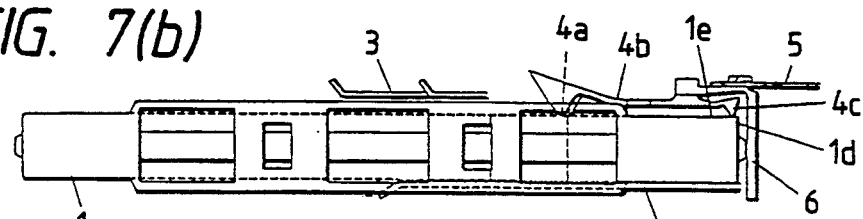
Figure 7C:
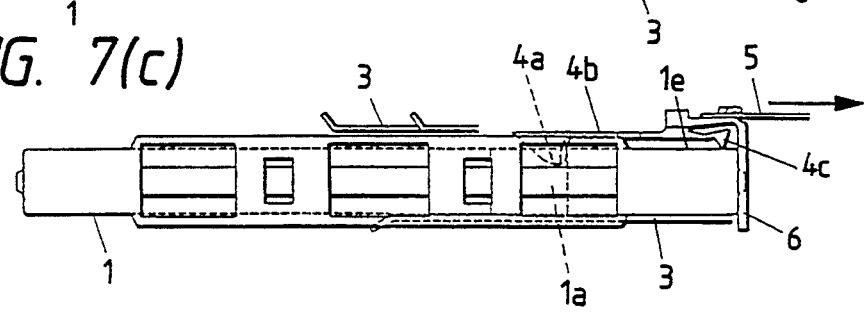
Figure 8:
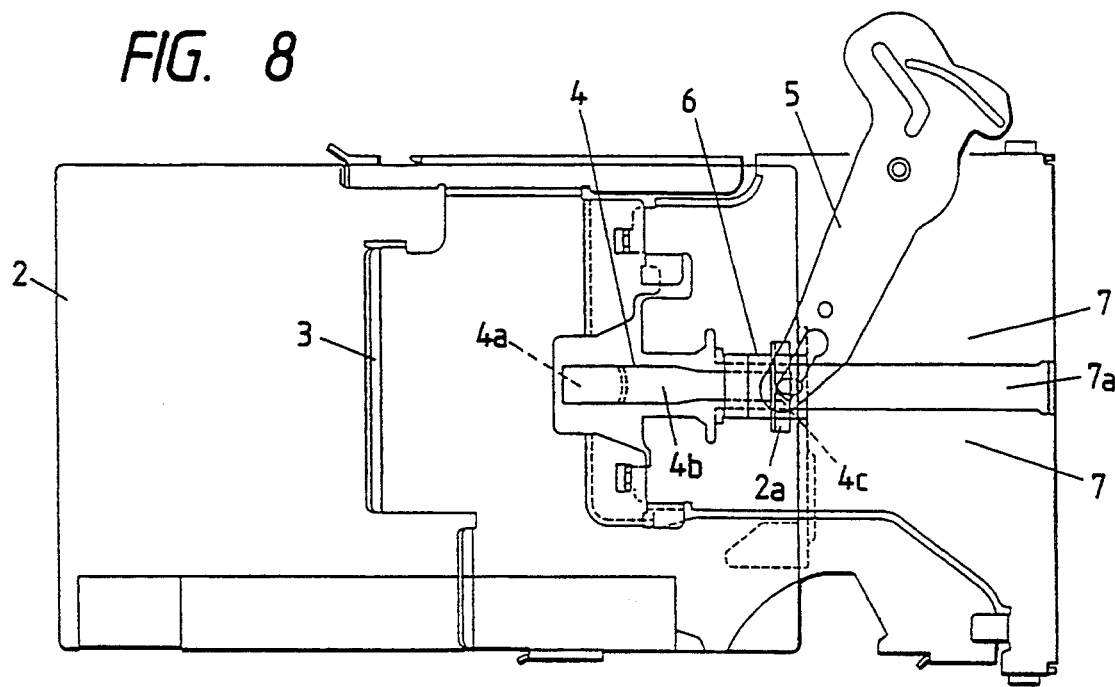
FIG. 8 is a plan view showing an operational condition wherein a second tape cassette (i.e., a digital tape cassette) is used in the tape recorder apparatus in accordance with the first embodiment.
Figure 9A:
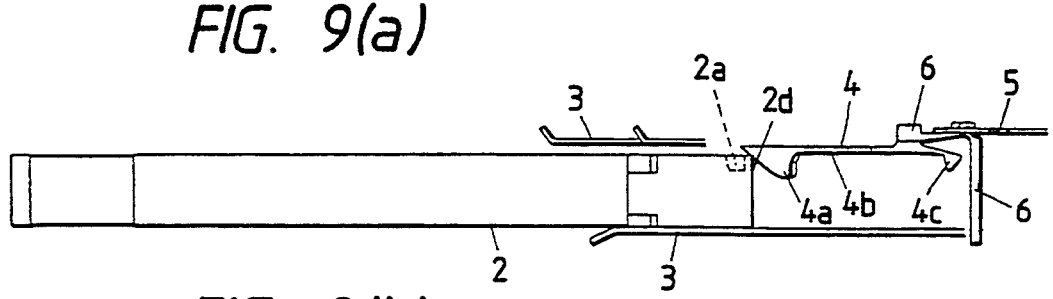
FIGS. 9(a) to 9(c) are side views respectively showing operational conditions of the above tape recorder apparatus per FIG. 8.
Figure 9B:
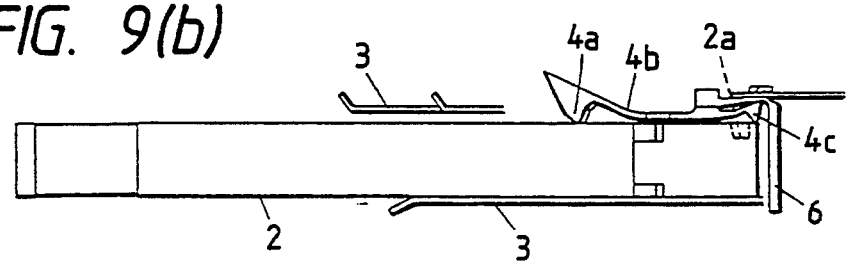
Figure 9C:
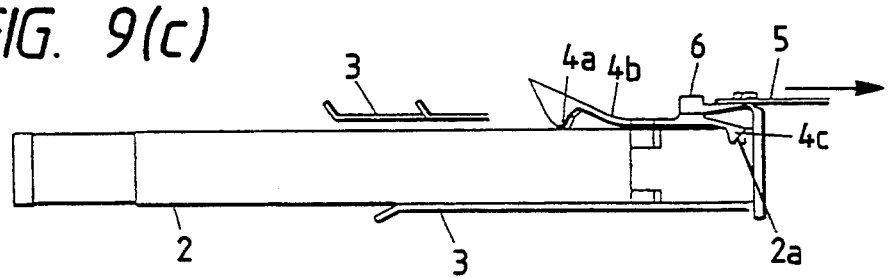

FIG. 6 is a plan view showing an operational condition wherein the first tape cassette (i.e., the ACC 1) is used in the tape recorder unit TRU. FIGS. 7(a) to 7(c) are side views showing operational conditions of the above tape recorder described in FIG. 6. FIG. 8 is a plan view showing another operational condition wherein the second tape cassette (i.e., the DCC 2) is used in the tape recorder unit TRU. FIGS. 9(a) to 9(c) are side views showing operational conditions of above tape recorder unit TRU described in FIG. 8.

First of all, as best seen in FIGS. 6 and 7, the ACC 1 is entered into the holder 3 from the left toward the right. A right edge 1d of the ACC1 abuts the first hook 4a of the retainer member 4, as shown in FIG. 7(a). That is, the first hook 4a basically extends downward into the inside space of the holder 3, so that it abuts to the upper edge (i.e., the right edge 1d) of the ACC 1. Therefore, in the case where a user inserts the ACC 1 in the holder 3 toward the right, the ACC 1 is stopped by the first hook 4a.

The first hook 4a is formed in a wedge shape. It is desirable because, with this arrangement, an inclined portion is formed on the first hook 4a. This inclined portion serves as a sort of guide for this first hook 4a to smoothly ride on the upper surface of the ACC 1. The user continues to push the ACC 1 toward the right against the reaction force of this retainer member 4. As the resilient arm 4b is made to yield against a predetermined pushing force, if the user applies a sufficiently large force on the ACC 1, the resilient arm 4b is bent and the first hook 4a is lifted upward by sliding on the right edge 1d of the ACC 1.

Then, the resilient arm 4b is further bent at the other end, when further pushed by the ACC 1, and the second hook 4c is lifted upward by sliding on the upper edge of the ACC 1 and completely rides on the upper surface of the ACC 1. Thus, the retainer member 4 completely rides on the upper surface of the ACC 1, as shown in FIG. 7(b).

Therefore, the user feels a significant amount of resistance while continuing to push the ACC 1. Ad this resistance force has an operational feeling and affects the durability of components, an adverse effect on the magnitude of this resistance force should be reduced to be as light as possible. For reducing this resistance force, the inclined portion of the first hook 4a works effectively. Therefore, in view of such a resistance force, the inclined angle of this inclined portion of the first hook 4a is determined to be an appropriate angle of, for example, 15 to 45 degrees.

Subsequently, as the user further applies an increasing pushing force on the ACC 1, the ACC 1 moves right so as to cause a mutual slip movement with respect to the first hook 4a. Then, the first hook 4a is finally positioned on the reel shaft insertion hole 1a and is engaged with this reel shaft insertion hole 1a by the springback force of the resilient arm 4b, as shown in FIG. 7(c). With this engagement, the user can feel an adequate click feelingly. Thus, the ACC 1 is completely locked with the retainer member 4, i.e., with the holder 3. The position shown in FIG. 7(c) is the first position explained in the foregoing description.

After that, the ACC 1 is shifted from this first position to the second position, being guided by the arm member 3 and the slider member 6. Thus, if the ACC 1 is further pushed inward (i.e., toward the right direction), this pushing force causes the slider member 6 to slide toward the right along the elongated groove 7a and the arm member 5 to swing in a counterclockwise direction, until the ACC 1 is fully inserted to the right end.

Then, the guide member 7 being pivotally supported by the shaft 7b, at the right end of the tape recorder unit TRU, causes a downward swing movement about this shaft 7b. Thus, the cantilevered left end of the guide member 7 is lowered and, in accordance with this lowering movement, the ACC 1 is lowered directly downward together with the holder 3 at the right end position until it settles in the second position, where the ACC 1 confronts with the magnetic head 8 and the pinch rollers 10, 10 disposed at the front end portion of the tape recorder unit TRU so as to enable the recording or the reproducing operation.

Next, with reference to FIGS. 8 and 9, an operation of this embodiment is explained in the case where the DCC 2 is loaded into the holder 3. In FIGS. 8 and 9, the DCC 2 is entered into the holder 3 from the left toward the right. A right edge 2d of the DCC 2 abuts the first hook 4a of the retainer member 4, as shown in FIG. 9(a). In the same wy as with the ACC 1 case described with reference to FIGS. 6 and 7, the first hook 4a basically extends downward into the inside space of the holder 3, so that it abuts to the upper edge (i.e., the right edge 2d) of the DCC 2. Therefore, in the case where the user inserts the DCC 2 in the holder 3 toward the right, the DCC 2 is stopped by the first hook 4a.

Then, if the user continues to push the DCC 2 toward the right, the first hook 4a rides on the upper surface of the DCC 2. As the resilient arm 4b is made to yield against the predetermined pushing force, if the user applies a sufficiently large force on the DCC 2, the resilient arm 4b is bent and the first hook 4a is lifted upward by sliding on the right edge 2d of the DCC 2. Then, the first hook 4a completely rides and slides on the upper surface of the DCC 2, without engaging with a grip slot 2a formed oil the upper surface of the DCC 2.

Thereafter, if the user further adds the pushing force on the DCC 2, the DCC 2 moves right so as to cause a mutual slip movement with respect to the first hook 4a. Then, the right edge 2d of the DCC 2 comes to abut to the second hook 4c.

The second hook 4c is formed in a wedge shape, as well as the first hook 4a, but is made smaller than the first hook 4a. The actual size of this second hook 4c is selected to fit to the grip slot 2a. Because of difference between the first hook 4a and the second hook 4c, the first hook 4a cannot engage with the trip slot 2a formed on the DCC 2.

It is needless to say that an inclined portion is also formed on the second hook 4c, as well as the first hook 4a. This inclined portion serves as a sort of guide for this second hook 4c to smoothly ride on the upper surface of the DCC 2. As the user continues to push the DCC 2 toward the right against the resilient force of the resilient arm 4b, the resilient arm 4b is bent and the second hook 4c is lifted upward by sliding on the right edge 2d of the DCC 2. Then, the resilient arm 4b is further bent at the other end, when further pushed by the DCC 2, and the second hook 4c is lifted upward by sliding on the upper edge of the DCC 2 and rides on the upper surface of the DCC 2. Thus, the retainer member 4 completely rides on the upper surface of the DCC 2, as shown in FIG. 9(b).

For the same reason as with the inclined portion of the first hook 4a, the inclined portion formed on the second hook 4c works effectively for reducing the resistance force adversely affecting the operational feeling and the durability of components. Therefore, the inclined angle of this inclined portion of the second hook 4c is selected so as to be an appropriate angle.

Subsequently, if the user further pushes the DCC 2 toward the right, the second hook 4c is finally positioned on the grip slot 2a and is engaged with this grip slot 2a by the springback force of the resilient arm 4b, as shown in FIG. 9(c). With this engagement, the user can feel an adequate click feeling. Thus, the DCC 2 is completely locked with the retainer member 4, i.e., with the holder 3. The position shown in FIG. 9(c) is the first position explained in the foregoing description.

After that, the DCC 2 is shifted from this first position to the second position, being guided by the arm member 3 and the slider member 6. That is, if the DCC 2 is further pushed inward (i.e., toward the right direction), this pushing force causes the slider member 6 to slide toward the right along the elongated groove 7a and the arm member 5 to swing in a counterclockwise direction, until the DCC 2 is fully inserted to the right end.

Then, the guide member 7 which is hingedly supported by the shaft 7b, at the right end of the tape recorder unit TRU, causes a downward swing movement about this shaft 7b. Thus, the cantilevered left end of the guide member 7 is lowered directly downward and, in accordance with this lowering movement, the DCC 2 is lowered together with the holder 3 at the right end position until it settles in the second position. The DCC 2 then confronts with the magnetic head 8 and the pinch rollers 10, 10 disposed at the front end portion of the tape recorder unit TRU so as to enable the recording or the reproducing operation.

Second Embodiment

A tape recorder apparatus in accordance with a second embodiment of the present invention is explained with reference to FIGS. 10 to 13.

The structure of the second embodiment is basically the same as for the first embodiment disclosed in FIGS. 1 to 5. Therefore, most of its detailed structure may be readily understood with reference to the explanation of the first embodiment as described in the foregoing description with reference to these FIGS. 1 to 5.

The second embodiment is different in that the retainer member 4 is swingably supported by a shaft 4d, which is secured to the shift member 6. That is, the shaft 4d of the retainer member 4 is positioned centrally on a line segment connecting two positions of the different engaging holes (i.e., the reel shaft insertion hole 1a and the grip slot 2a) formed on the two different kinds of tape cassettes (i.e., the ACC 1 and the DCC 2) under the condition where the tape cassettes are completely inserted into the holder 3.

In more detail, the resilient arm 4b is pivotally supported by this shaft 4d. The shaft 4d is disposed along a back-and-forth direction of the tape recorder unit TRU in parallel with the upper surface of the holder 3 but perpendicular to the insertion direction of the first and second tape cassettes 1 and 2 (i.e., ACC 1 and DCC 2), so that the retainer member 4 can cause a seesaw movement about this shaft 4d on a plane parallel to the insertion direction of the first and second tape cassette 1 and 2.

Hereinafter, an operation of the tape recorder constituted as described above is explained with reference to FIGS. 10 to 13.

Figure 10:
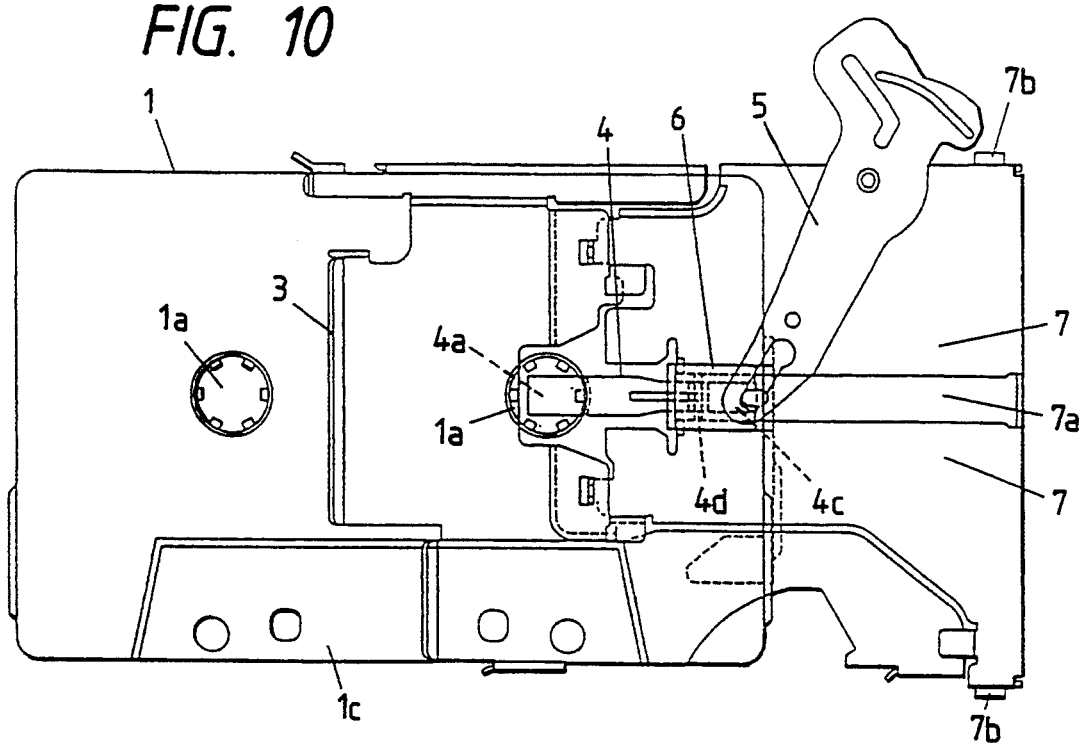
FIG. 10 is a plan view showing an operational condition wherein the first tape cassette is used in the tape recorder apparatus in accordance with the second embodiment.
Figure 11A:
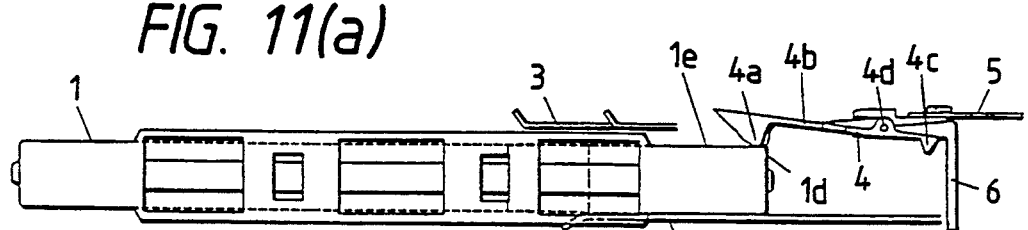
FIGS. 11(a) to 11(c) are side views respectively showing operational conditions of the above tape recorder apparatus per FIG. 10.
Figure 11B:
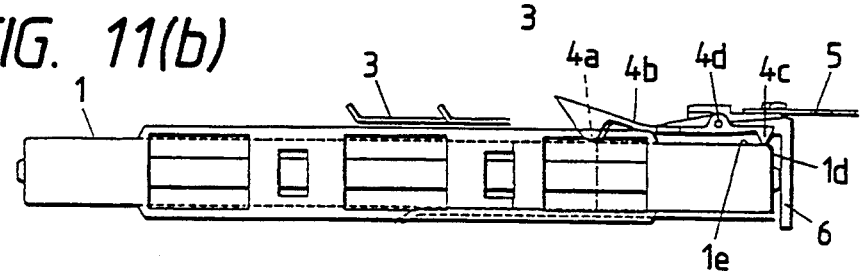
Figure 11C:
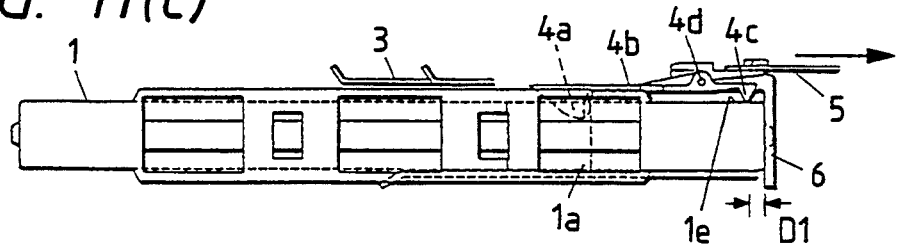
Figure 12:
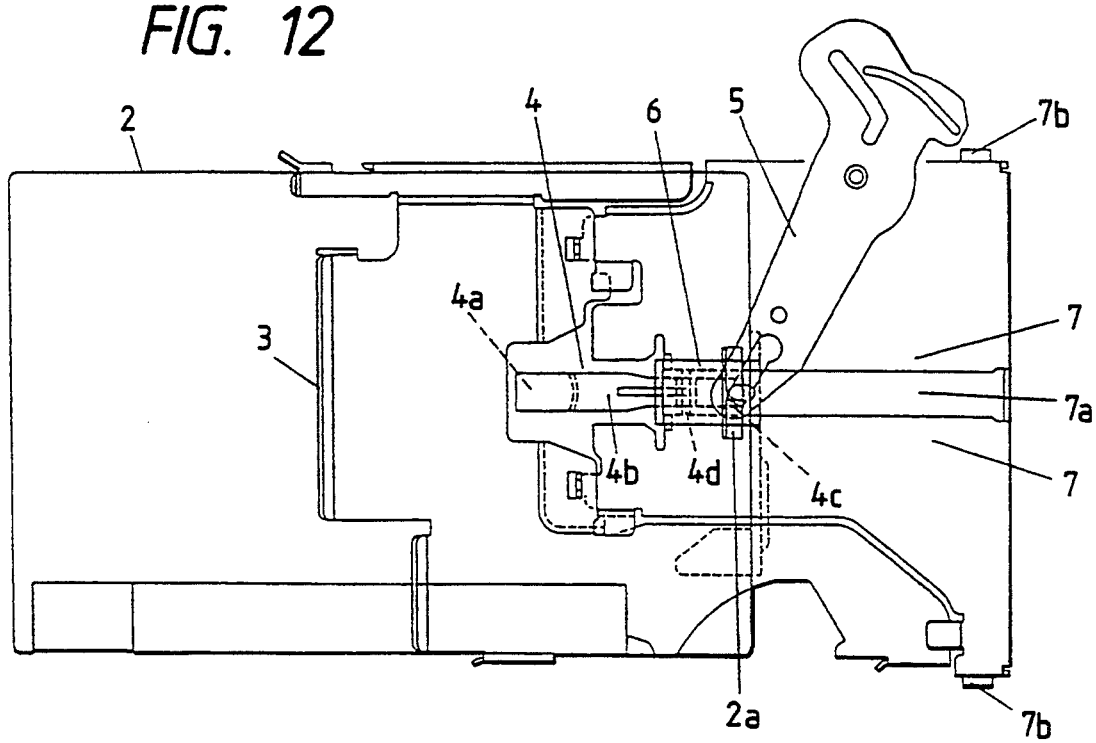
FIG. 12 is a plan view showing an operational condition wherein the second tape cassette is used in the tape recorder apparatus in accordance with the second embodiment.
Figure 13A:
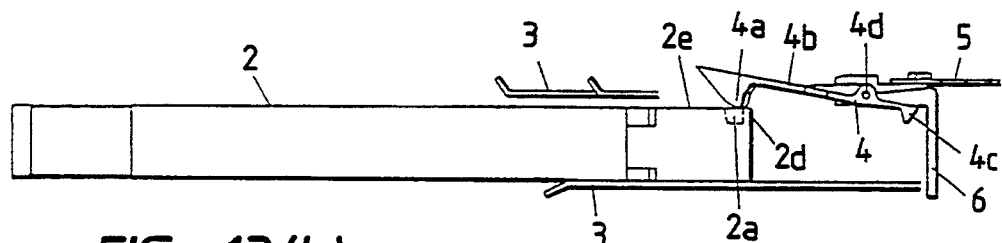
FIGS. 13(a) to 13(c) are side views respectively showing operational conditions of the above tape recorder apparatus per FIG. 12.
Figure 13B:
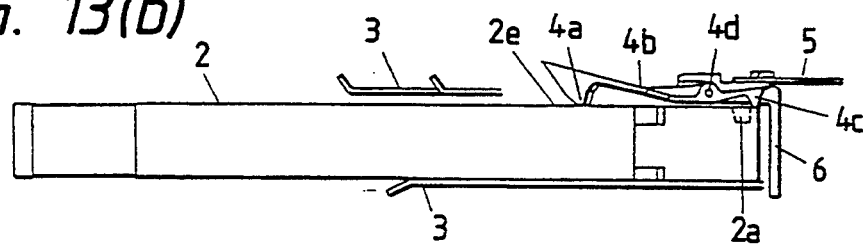
Figure 13C:
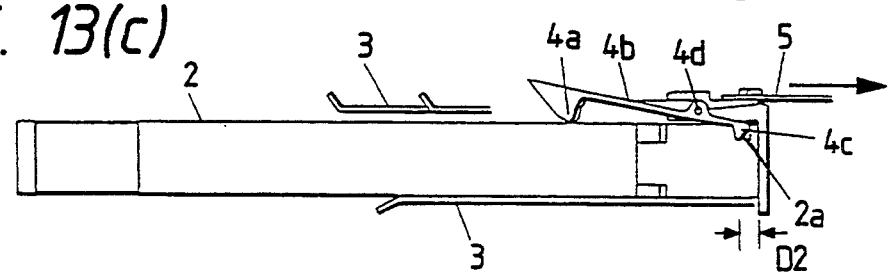

FIG. 10 is a plan view showing an operational condition wherein the first tape cassette (i.e., the ACC 1) is used in the tape recorder unit TRU. FIGS. 11(a) to 11(c) are side views showing operational conditions of the tape recorder unit TRU described in FIG. 10. FIG. 12 is a plan view showing an operational condition wherein the second tape cassette (i.e., the DCC 2) is used in the tape recorder unit TRU. FIGS. 13(a) to 13(c) are side views showing operational conditions described in FIG. 12.

First of all, in FIGS. 10 and 11, the ACC 1 is entered into the holder 3 from the left toward the right. A right edge 1d of the ACC 1 abuts the first hook 4a of the retainer member 4 and rides on the upper surface of the ACC 1, as shown in FIG. 11(a). The resilient arm 4b of the retainer member 4 is not yet bent in this condition, since the arm 4b only causes a swing movement about the shaft 4d in this case.

The first hook 4a is thus disposed to basically extend downward into the inside space of the holder 3, so that it abuts to the upper edge (i.e., the right edge 1d) of the ACC 1. Therefore, in the case where the user inserts the ACC 1 in the holder 3 toward the right, the ACC 1 hits the first hook 4a and then the first hook 4a is lifted upward by being swung about the shaft 4d, without receiving a significant resistance force because the spring force of the resilient arm 4b does not act yet as the resistance force in this condition.

The first hook 4a is formed in a wedge shape in the same manner as in the first embodiment. Therefore, the inclined portion formed on the first hook 4a can serve as a sort of guide for this first hook 4a to smoothly ride on the upper surface of the ACC 1.

Subsequently, if the user continues to push the ACC 1 toward the right, the ACC 1 causes a relative shift movement with respect to the retainer member 4 until the right edge 1d of the ACC 1 abuts to the second hook 4c. In this condition, as the user further continues to push the ACC 1 toward the right against the reaction force of this retainer member 4, the resilient arm 4b yields against this pushing force. Accordingly, the resilient arm 4b is bent and the second hook 4c is lifted upward by sliding on the right edge 1d of the ACC 1. Then, the second hook 4a completely rides on the upper surface of the ACC 1, as shown in FIG. 11(b).

Therefore, the relationship between the retainer member 4 and the first tape cassette (ACC) 1 is determined in such a manner that the resilient arm 4b of the retainer member 4 is bent only when both the first and second hooks 4a and 4c being provided at opposite ends of the resilient arm 4b are raised on the upper surface of the first tape cassette 1.

Therefore, the user feels a significant amount of resistance while continuing to push the ACC 1. As this resistance force has an adverse effect on the operational feeling and the durability of components, the magnitude of this resistance force should be reduced to be as light as possible. For reducing this resistance force, it is desirable that the inclined angle of the inclined portion of the second hook 4c is determined to be an appropriate angle to reduce the resistance force as described in the description of the first embodiment.

At the same time, in order to reduce such a resistance force, it is also preferable to shorten the distance during which the retainer member 4 (i.e., the first and the second hooks 4a and 4c) causes the frictional shift movement on the upper surface of the first cassette 1. This second embodiment is characterized in that it cab surely shorten this distance of the frictional shift movement.

Thus, as the user increases the pushing force applied on the ACC 1 from the position shown in FIG. 11(b) toward the right, the ACC 1 slightly moves right so as to cause a mutual frictional shift movement with respect to the first and second hooks 4a, 4c. Then, the first hook 4a is finally positioned on the reel shaft insertion hole 1a and is engaged with this reel shaft insertion hole 1a by the springback force of the resilient arm 4b, as shown in FIG. 11(c).

With this engagement, the user can feel an adequate click feeling without receiving a resistance for too long a time. Thus, the ACC 1 is completely locked with the retainer member 4; i.e., with the holder 3. The position shown in FIG. 11(c) is the first position explained in the foregoing description.

After that, the ACC 1 is shifted from this first position to the second position, being guided by the arm member 3 and the slider member 6. That is, if the ACC 1 is further pushed inward (i.e., toward the right direction), this pushing force causes the slider member 6 to slide toward the right along the elongated groove 7a and the arm member 5 to swing in a counterclockwise direction, until the ACC 1 is fully inserted to the right end.

Then, the guide member 7 being hingedly supported by the shaft 7b, at the right end of the tape recorder unit TRU, causes a downward swing movement about this shaft 7b. Thus, the cantilevered left end of the guide member 7 is lowered and, in accordance with this lowering movement, the ACC 1 is lowered together with the holder 3 at the right end position until it settles in the second position, were the ACC 1 confronts with the magnetic head 8 and the pinch rollers 10, 10 disposed at the front end portion of the tape recorder unit TRU so as to enable the recording or the reproducing operation.

Next, with reference to FIGS. 12 and 13, an operation in the case where the DCC 2 is loaded into the holder 3 is explained. In FIGS. 12 and 13, the DCC 2 is entered into the holder 3 from the left toward the right. A right edge 2d of the DCC 2 abuts the first hook 4a of the retainer member 4 and rides on the upper surface of the DCC 1, as shown in FIG. 13(a). The resilient arm 4b of the retainer member 4 is not yet bent in this condition, since the arm 4b only causes a swing movement about the shaft 4d in this case.

That is, the first hook 4a is disposed to basically extend downward into tile inside space of the holder 3, so that it abuts to the upper edge (i.e., the right edge 1d) of the DCC 2. Therefore, in the case where the user inserts the DCC 2 in the holder 3 toward the right, the DCC 2 hits the first hook 4a and then the first hook 4a is lifted upward by being swung about the shaft 4d, without receiving a significant resistance force because the spring force of the resilient arm 4b does not act yet as the resistance force in this condition.

It is needless to say that the inclined portion formed on the first hook 4a can serve as a sort of guide for this first hook 4a to smoothly ride on the upper surface of the DCC 2.

Subsequently, if the user continues to push the DCC 2 toward the right, the DCC 2 causes a relative shift movement with respect to the retainer member 4 until the right edge 2d of the DCC 2 abuts to the second hook 4c. In this condition, if the user further continues to push the DCC 2 toward the right against the reaction force of this retainer member 4, the resilient arm 4b yields against this pushing force. Accordingly, the resilient arm 4b is bent and the second hook 4c is lifted upward by sliding on the right edge 2d of the DCC 2. Then, the second hook 4a completely rides on the upper surface of the Dee 2, as shown in Pig. 13(b).

Therefore, the relationship between the retainer member 4 and the second tape (i.e., DCC 2) is determined in such a manner that the resilient arm 4b of the retainer member 4 is bent only when both the first and second hooks 4a and 4c being provided at opposite ends of the resilient arm 4b are raised on the upper surface of the second tape cassette 2.

Therefore, the user feels a significant amount of resistance while continuing to push the ACC 1. By the same reason described above, i.e., in view of a possible adverse effect on the operational feeling and the durability of the components, the magnitude of this resistance force should be reduced to be as light and small as possible.

As described in the foregoing description, this second embodiment is characterized in that it can surely shorten this distance of the frictional shift movement.

Therefore, if the user further add the pushing force on the DCC 2 from the position shown in FIG. 13(b) toward the right, the DCC 2 slightly moves right so as to cause a mutual frictional shift movement with respect to the first and second hooks 4a, 4c. Then, the second hook 4c is finally positioned on the grip slot 2a and is engaged with this grip slot 2a by the springback force of the resilient arm 4b, as shown in FIG. 13(c).

With this engagement, the user can feel an adequate click feeling without receiving a resistance so long time. Thus, the ACC 1 is completely locked with the retainer member, i.e., with the holder 3. The position shown in FIG. 13(c) is the first position explained in the foregoing description.

After that, the DCC 2 is shifted from this first position to the second position, being guided by the arm mender 3 and the slider member 6. That is, if the DCC 2 is further pushed inward (i.e., toward the right direction), this pushing force causes the slider member 6 to slide toward the right along the elongated groove 7a and the arm member 5 to swing in a counterclockwise direction, until the DCC 2 is fully inserted to the right end.

Then, the guide member 7 being hingedly supported by the shaft 7b, at the right end of the tape recorder unit TRU, causes a downward swing movement about this shaft 7b. Thus, the cantilevered left end of the guide member 7 is lowered and, in accordance with this lowering movement, the DCC 2 is lowered together with the holder 3 at the right end position until it settles in the second position, where the DCC 2 confronts with the magnetic head 8 and the pinch rollers 10, 10 disposed at the front end portion of the tape recorder unit TRU so as to enable the recording of the reproducing operation.

In accordance with this second embodiment, the tape cassette 1 or 2 can be surely prevented from excessive wear due to the frictional engagement between the hooks 4a, 4c of the retainer member 4 and the tape cassette 1 or 2. This is because the distance during which the tape cassette 1 or 2 receives the frictional force is quite short, i.e., a short distance D1 shown in FIG. 11(c) in the case of the first cassette 1, which corresponds to a distance from the point where the second hook 4c rides on the upper surface of the ACC 1 to the position where the first hook 4a engages with the reel shaft insertion hole 1a. On the other hand, it may be the short distance D2 shown in FIG. 13(c) in the case of the second cassette 2, which corresponds to a distance from the point where the second hook 4c rides on the upper surface of the DCC 2 to the position where the second hook 4c engages with the grip slot 2a.

Third Embodiment

A tape recorder apparatus in accordance with the third embodiment of the present invention is explained hereinafter with reference to FIGS. 14 to 17.

The structure of the third embodiment is basically the same as the first embodiment disclosed in FIGS. 1 to 5. Therefore, its detail structure should be referred to in the explanation in the first embodiment described in the foregoing description with reference to these FIGS. 1 to 5.

The third embodiment is characterized in that the retainer member 4 has the structure similar to that in the second embodiment, but is different from this second embodiment in that the retainer member 4 has a pair of protruding pieces 4e, 4e, which extend from one end near the first hook 4a in parallel with the shaft 4d of the retainer member 4. Each of the protruding pieces 4e, 4e is made in a flat plate configuration which extends along a back-and-forth direction of the tape recorder unit TRU, i.e., along the axial direction of the shaft 4d of the retainer member 4.

That is, the protruding pieces 4e, 4e are integrally formed with the hooks 4a, 4c and pivotally supported by the shaft 4d. As the shaft 4d is disposed along a back-and-forth direction of the tape recorder unit TRU in parallel with the upper surface of the holder 3 but perpendicular to the insertion direction of the first and second tape cassettes (i.e., ACC and DCC) 1 and 2, the protruding pieces 4e, 4e can cause a seesaw movement together with the hooks 4a, 4c about this shaft 4d in a plane parallel to the insertion direction of the first and second tape cassette 1 and 2.

Figure 16:
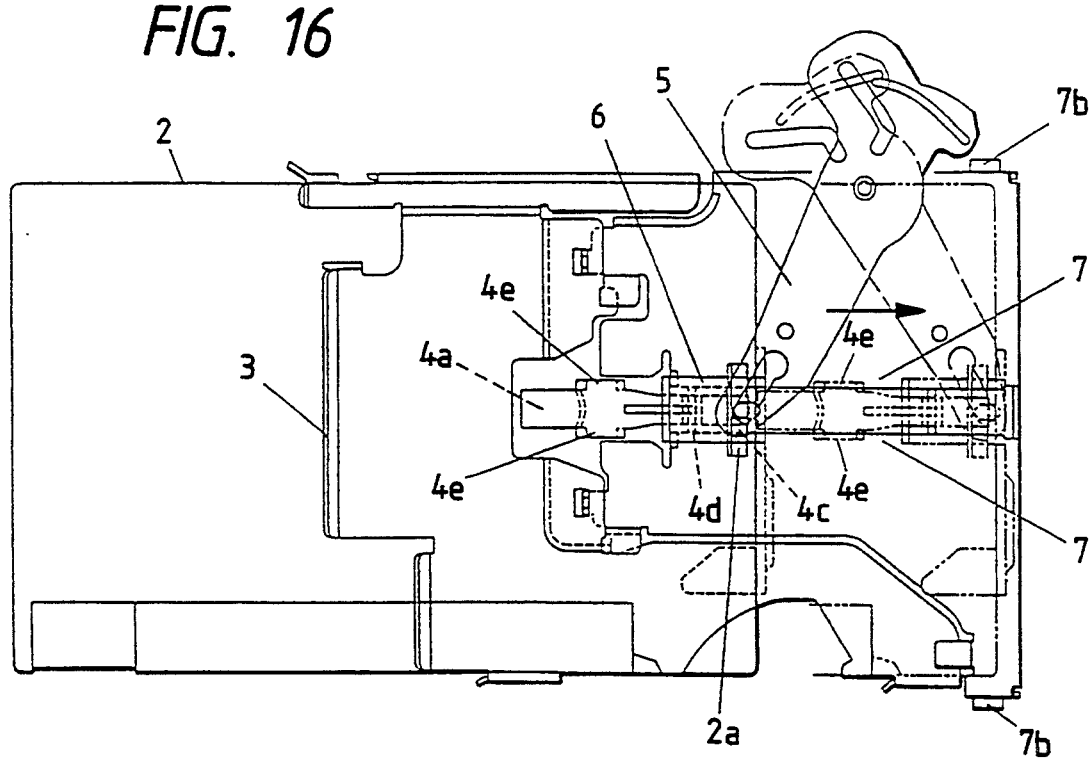
FIG. 16 is a plan view showing operational conditions wherein the second tape cassette is used in the tape recorder apparatus in accordance with the third embodiment.

In more detail, as can be seen in FIG. 16, in the first position illustrated by a solid line, the protruding pieces 4e, 4e are positioned not to interfere with the guide member 7. Therefore, in this first condition, the protruding pieces 4e, 4e can allow the retainer member 4 to cause a seesaw movement in a clockwise direction in a plane parallel to the insertion direction of the first and second tape cassette 1 and 2. Therefore, when the user inserts the tape cassette 1 or 2 in the holder 3, the retainer member 4 freely swings in a clockwise direction and rides on the upper surface of the tape cassette 1 or 2. If the retainer member 4 is forced to cause a swing movement in a counterclockwise direction, the second hook 4c immediately abuts to the lower surface of the guide member 7. Therefore, the retainer member 4 is free to cause a swing movement from its horizontal position in a clockwise direction, but not free to cause a swing movement from its horizontal position in a counterclockwise direction.

On the other hand, the protruding pieces 4e, 4e act as follows, after the tape cassette 1 or 2 is locked together with the retainer member 4.

Hereinafter, an operation of the tape recorder constituted as described above is explained with reference to other relevant drawing figures.

Figure 14:
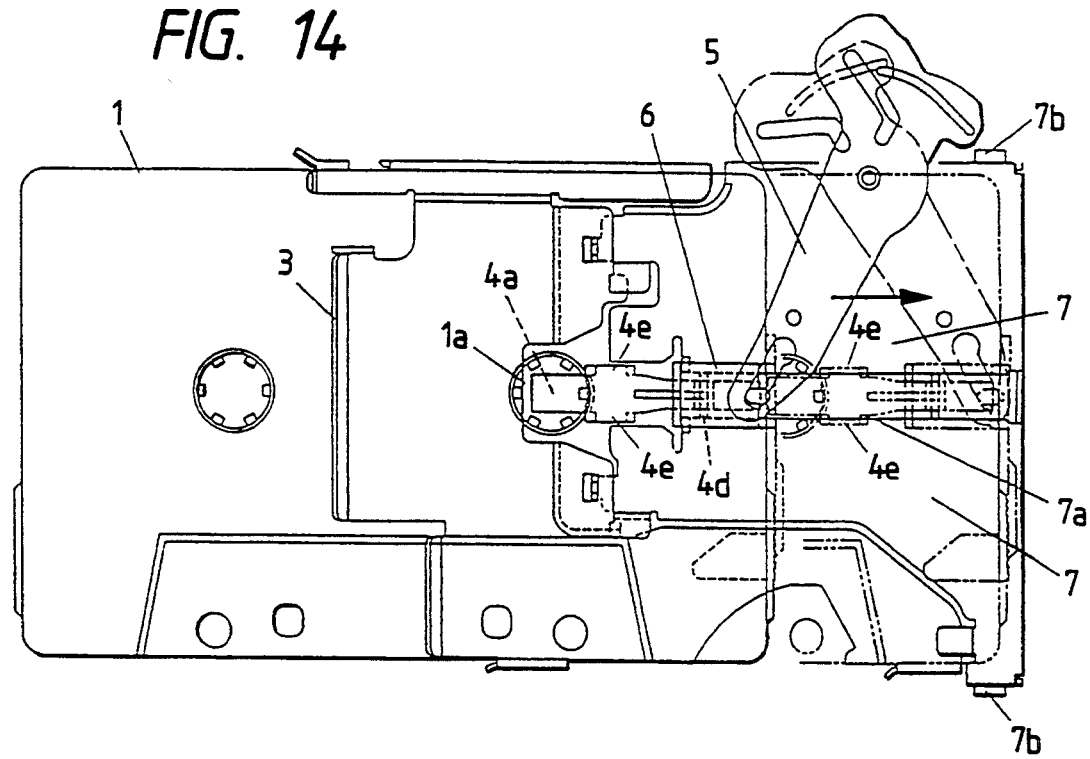
FIG. 14 is a plan view showing operational conditions wherein the first tape cassette is used in the tape recorder apparatus in accordance with the third embodiment.
Figure 15A:
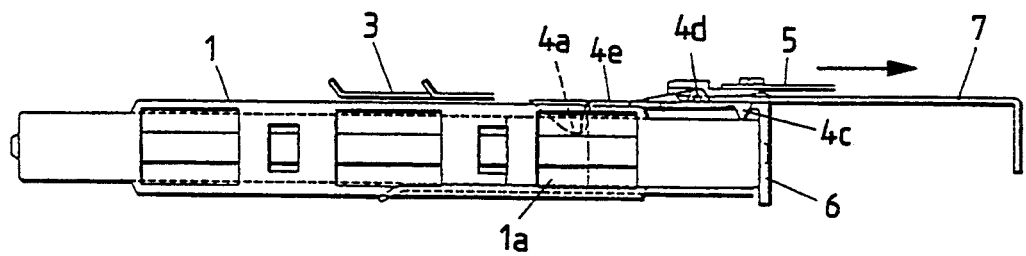
FIGS. 15(a) and 15(b) are side views respectively showing operational conditions of the above tape recorder apparatus per FIG. 14.
Figure 15B:
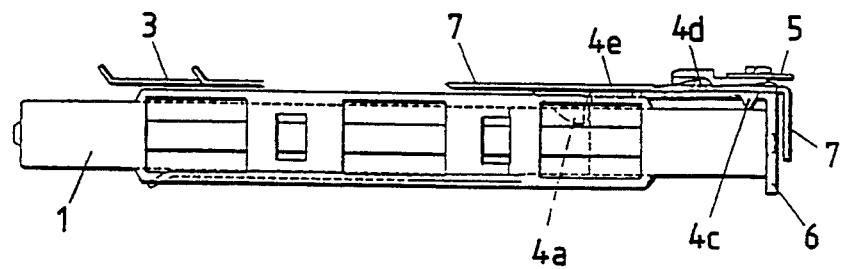
Figure 17A:
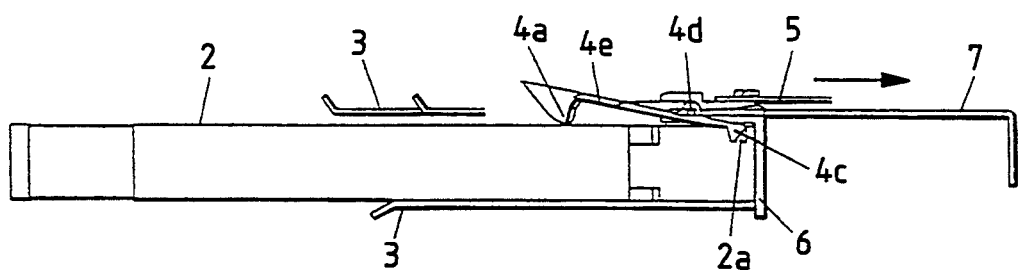
FIGS. 17(a) and 17(b) are side views respectively showing operational conditions of the above tape recorder apparatus per FIG. 16.
Figure 17B:
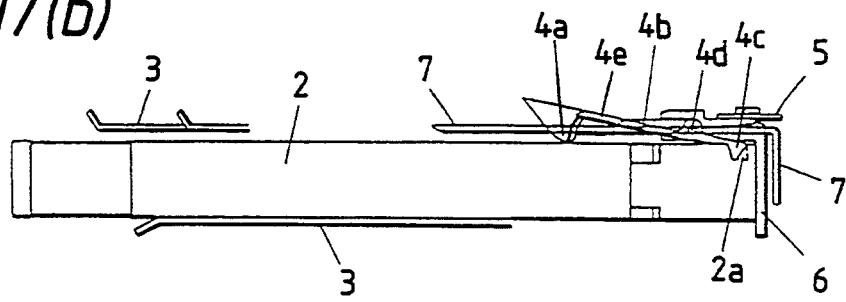

FIG. 14 is a plan view showing operational conditions wherein the first tape cassette (i.e., the ACC 1) is used in the tape recorder unit TRU. FIGS. 15(a) and 15(b) are side views showing above operational conditions described in FIG. 14. FIG. 16 is a plan view showing operational conditions wherein the second tape cassette (i.e., the DCC 2) is used in the tape recorder unit TRU. FIGS. 17(a) and 17(b) are side views showing above operational conditions described in FIG. 16.

First of all, in case of the ACC 1, in the first position where the ACC 1 is completely inserted in the holder 3 as shown in FIG. 15(a), the first hook 4a engages with the reel shaft insertion hole 1a of the ACC 1 and the second hook 4c rides on the upper surface of the ACC 1 through the similar engaging operation described in the second embodiment. In this condition, the retainer member 4 is disposed in parallel with holder member 3 and the guide member 7. Therefore, the protruding pieces 4e, 4e are positioned horizontally, i.e., in parallel with the guide member 7, and also positioned lower than the guide member 7.

From this condition, if the ACC 1 is shifted by means of the cooperative movement of the arm member 5 and the slider 6 along the elongated groove 7a toward the right as shown by an arrow in FIGS. 14 and 15(a), the protruding pieces 4e, 4e enter under the guide member 7, as shown in FIG. 15(b).

As the surface of the protruding piece 4e confronts closely with the lower surface of the guide member 7, the protruding pieces 4e, 4e are immediately abutted to the lower surface of the guide member 7 if the retainer member 4 causes a seesaw movement in a clockwise direction. The retainer member 4 is thus restricted to swing in a clockwise direction. On the other hand, as explained above, the retainer member 4 is locked by the second hook 4c, confronting with the lower surface of the guide member 7, not to cause a swing movement in the counterclockwise direction. Consequently, the retainer member 4 is completely locked not to rotate about the shaft 4d in any direction.

In the same fashion, in case of the DCC 2, in the first position where the DCC 2 is completely inserted in the holder 3 as shown in FIG. 17(a), the first hook 4a rides on the upper surface of the DCC 2 and the second hook 4c engages with the grip slot 2a of the DCC 2 through the similar engaging operation described in the second embodiment. In this condition, the retainer member 4 is disposed obliquely with respect to the holder member 3 and the guide member 7. Therefore, the protruding pieces 4e, 4e are also positioned obliquely and, therefore, positioned upper than the guide member 7.

From this condition, if the DCC 2 is shifted by means of the cooperative movement of the arm member 5 and the slider 6 along the elongated groove 7a toward the right as shown by an arrow in FIGS. 16 and 17(a), each of the protruding pieces 4e, 4e positions above the guide member 7, as shown in FIG. 17(b).

As the surface of the protruding piece 4e confronts closely with the lower surface of the guide member 7, the protruding pieces 43, 43 are immediately abutted to the lower surface of the guide member 7 if the retainer member 4 causes a seesaw movement in a counterclockwise direction. That is, the retainer member 4 is restricted to swing in a counterclockwise direction. On the other hand, as the retainer member 4 is locked by the second hook 4c, engaging with the grip slot 2a of the DCC 2, not to cause a swing movement in the clockwise direction. Consequently, the retainer member 4 is completely locked not to rotate about the shaft 4d in any direction.

In accordance with this third embodiment, the engagement of the retainer member 4 and the tape cassette (i.e., the ACC 1 and the DCC 2) can be securely maintained during the transportation from the above-shown first position (FIGS. 15(a) and 17(a)) to the second position where the tape cassette 1 or 2 confronts with the magnetic head 8 and the pinch rollers 10, 10 fixedly disposed at the front end portion of the tape recorder unit TRU so as to enable the recording or the reproducing operation.

Accordingly, even if an external force is unexpectedly applied on the ACC 1 or the DCC 2, especially in a direction opposite to the shifting direction, undesirable disengagement can be surely prevented.

Fourth Embodiment

A tape recorder apparatus in accordance with the fourth embodiment of the present invention is explained hereinafter with reference to FIGS. 18 to 20.

The structure of the fourth embodiment is basically the same as for the first embodiment disclosed in FIGS. 1 to 5. Therefore, its detailed structure may be readily understood by reference to the explanation of the first embodiment as described in the foregoing description with reference to FIGS. 1 to 5.

The third embodiment has a structure generally similar to that of the second embodiment, but is different from this second embodiment in that there is provided an urging member 11 that acts to urge the second hook 4c of the retainer member 4 downward.

The urging member 11 has a base end fixed to the slider member 6 and a distal end abutting to the second hook 4c. The urging member 11 is made of a resilient member, like a leaf spring. This urging member 11 is bent at the center thereof, so as to form the substantially V shape. The base end of this urging member 11 is secured to the vertical wall portion of the slider 6 and extends upward, and then, is curved to the left. The curved portion of this urging member 11 abuts to the lower surface of the slider member 6 extending horizontally. The distal end of the urging member 11 extends obliquely from this curved portion toward the left and downward. Then, the distal end abuts to the back of the retainer member 4 near the second hook 4c from the top.

Accordingly, if the retainer member 4 causes a swing movement in a counterclockwise direction, the urging member 11 give the retainer member 4 a resilient force against this swing movement, so as to return the retainer member 4 to its home position. Therefore, the retainer member 4 is always urged in the clockwise direction. Thus, the retainer member 4 is obliquely positioned in the condition that the tape cassette is not inserted in the holder 3, so that the first hook 4a disposed at an opposite end of the retainer member 4 is raised upward.

FIG. 18(a) is a plan view showing an operational condition wherein the second tape cassette (i.e., the DCC 2) is used in the tape recorder unit TRU. FIG. 18(b) is a side view showing above operational condition described in FIG. 18(a).

As best seen in FIGS. 18(a) and 18(b), when the user inserts the DCC 2, the right edge 2d of the DCC 2 hits the inclined portion of first hook 4a. The inclined portion of the first hook 4a serves as the guide when the retaining member 4 rides on the upper surface of the DCC 2. In the case where the retainer member 4 is swung by being pushed by the tape cassette inserted in the holder 3 as described in the first to third embodiments, the length of this inclined portion need to be set to a sufficiently long value.

However, in this fourth embodiment, the first hook 4a is already raised upward in advance before the tape cassette (the DCC 2) is inserted in the holder 3. Therefore, the first hook 4a can soon ride on the upper surface of the DCC 2 with a slight sliding movement. IN other words, the urging member 11 acts to urge the retainer member 4 to raise its one end positioned closely to the tape cassette to be inserted in the holder 3, so that the retainer member 4 can soon ride on the upper surface of the tape cassette with the smallest swing movement.

Thus, it becomes possible to shorten the length of this inclined portion of the first hook 4a. Namely, as shown by a dotted line in FIG. 18(b), an area 4g can be removed from the first hook 4a. With this arrangement, it becomes possible to reduce the height of the retainer member 4 for fabricate the retainer member 4 to make it compact in size.

Furthermore, the urging member 11 has another function, which will be described hereinafter with reference to FIGS. 19 and 20. Namely, in the transportation of the tape cassette (i.e., ACC 1 or DCC 2) from the first position to the second position, the urging member 11 can serve to tightly hold the tape cassette, even if the external force such as vibration is unexpectedly applied on the tape cassette.

Figure 19:
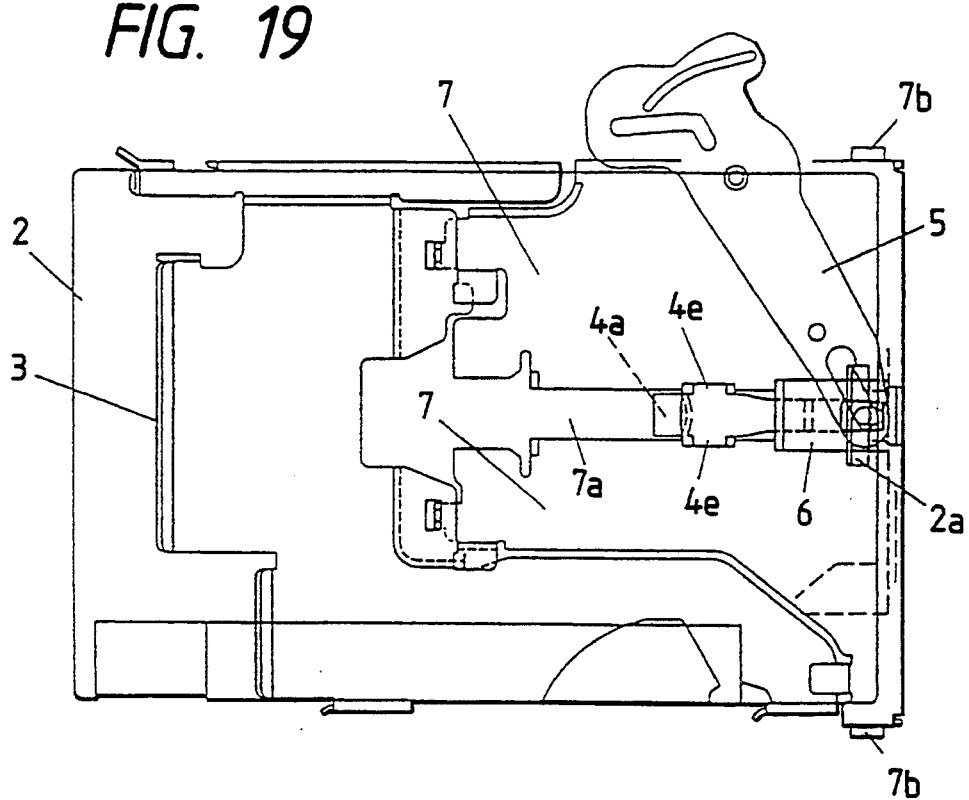
FIG. 19 is a plan view showing an operational condition wherein the second tape cassette is used in the tape recorder apparatus in accordance with the fourth embodiment.

As described above, the tape cassette 1 or 2 is shifted by means of the cooperative movement of the arm member 5 and the slider 6 along the elongated groove 7a toward the right, until it reaches the right end as shown in FIG. 19. Then, the guide member 7 causes a downward swing movement about its shaft 7b so that the holder 3 can be lowered together with the guide member 7.

In this lowering movement of the holder 3, the tape cassette 1 or 2 is loosely engaged with its reel shaft (not shown), i.e., the reel shaft is loosely inserted into the reel shaft insertion hole 1a of the ACC 1 or the reel hub 2c of the DCC 2. Therefore, the tape cassette 1 or 2 may move along the reel shaft if the external force such as vibration is applied.

Figure 20A:
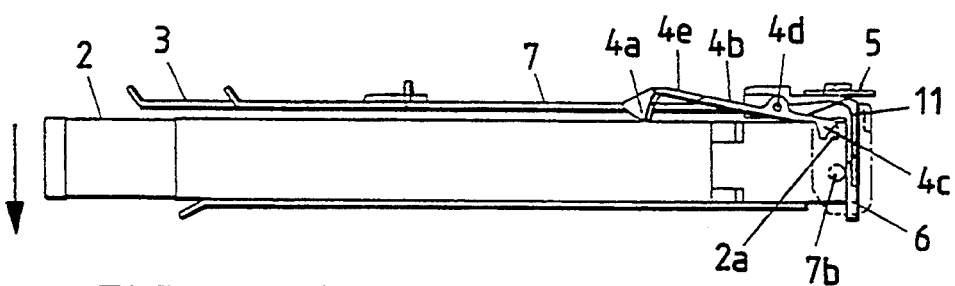
FIGS. 20(a) and 20(b) are side views respectively showing operational conditions of the above tape recorder apparatus per FIG. 19.
Figure 20B:
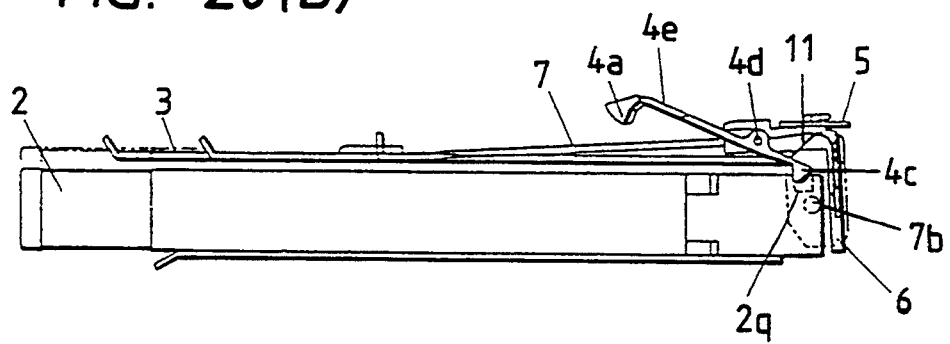
Figure 21:
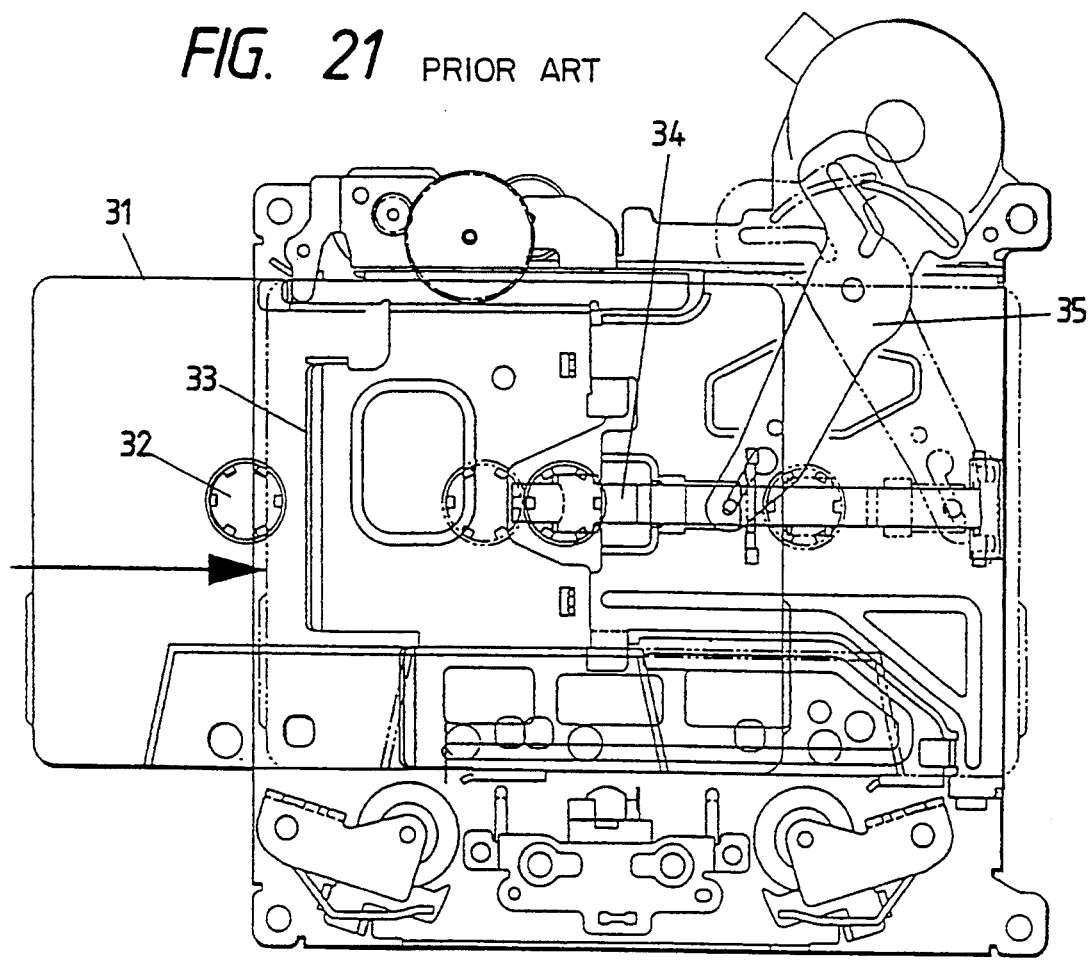
FIG. 21 is a plan view showing an analogue tape recorder apparatus which exclusively uses the first tape cassette.
Figure 22:
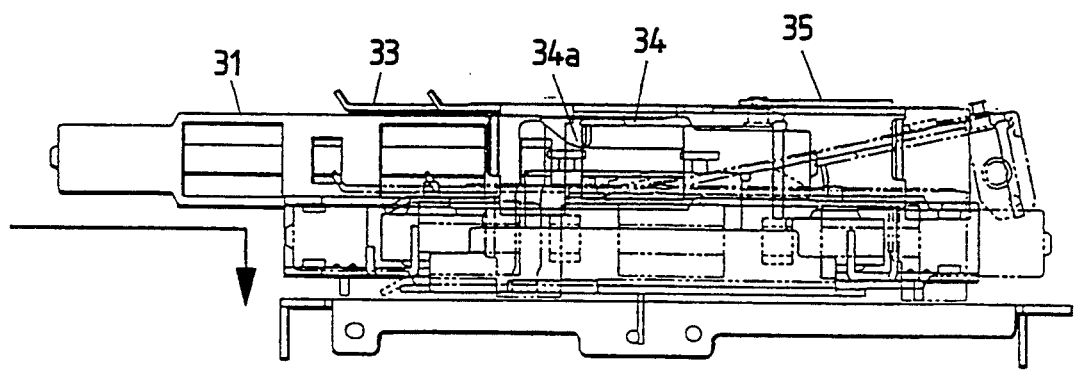
FIG. 22 is a side view showing the analogue tape recorder apparatus shown in FIG. 21.
Figure 23:
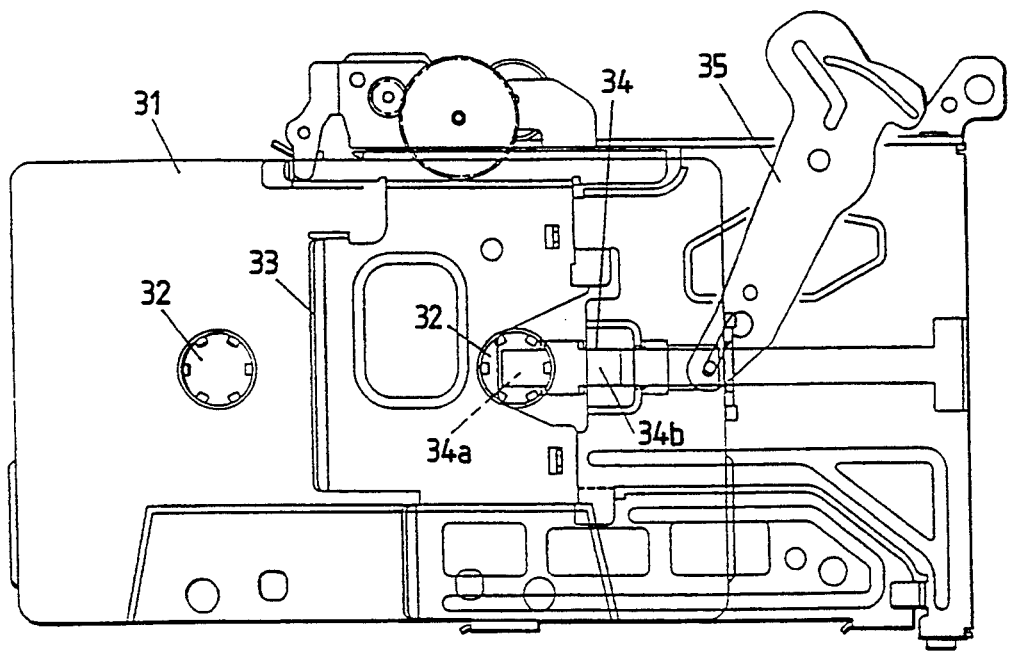
FIG. 23 is a plan view showing an operational condition wherein the first tape cassette is used in this analogue tape recorder apparatus.
Figure 24A:
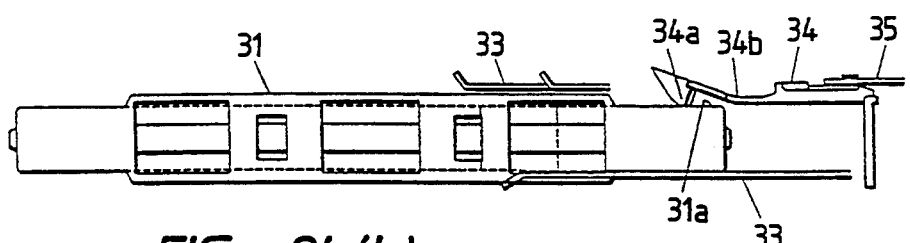
FIGS. 24(a) and 24(b) are side views respectively showing operational conditions of the above analogue tape recorder apparatus per FIG. 23.
Figure 24B:
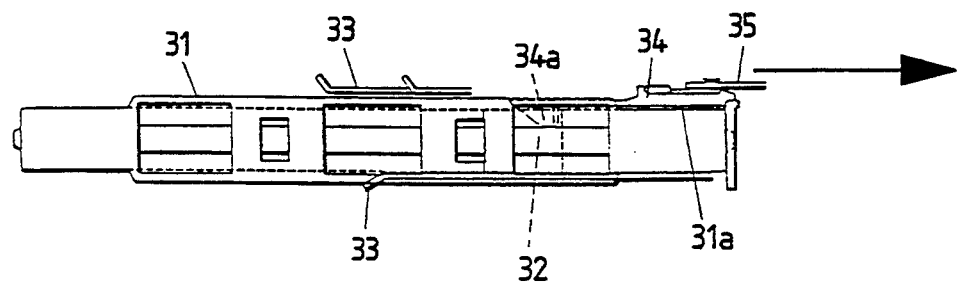
Figure 25A:
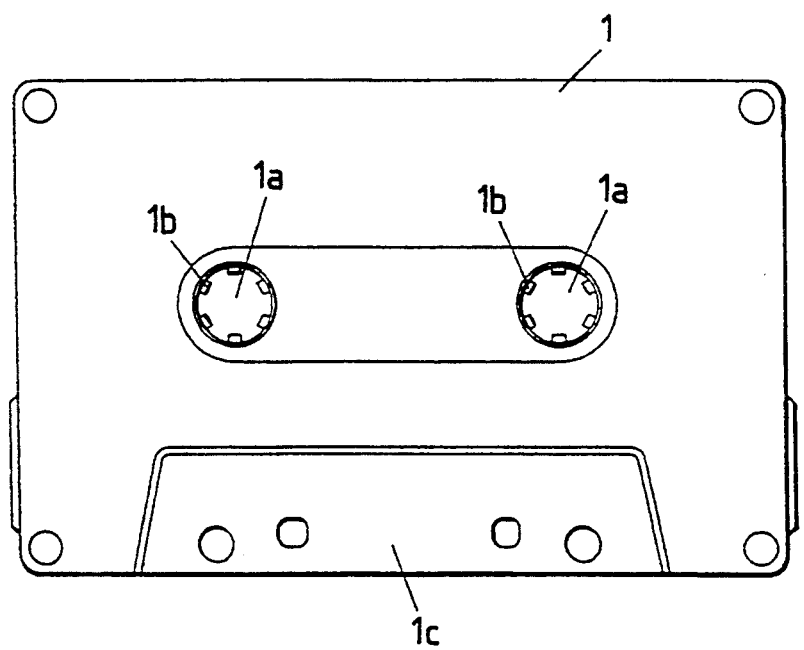
FIGS. 25(a) and 25(b) are plan views showing the first and second tape cassettes, respectively.
Figure 25B:
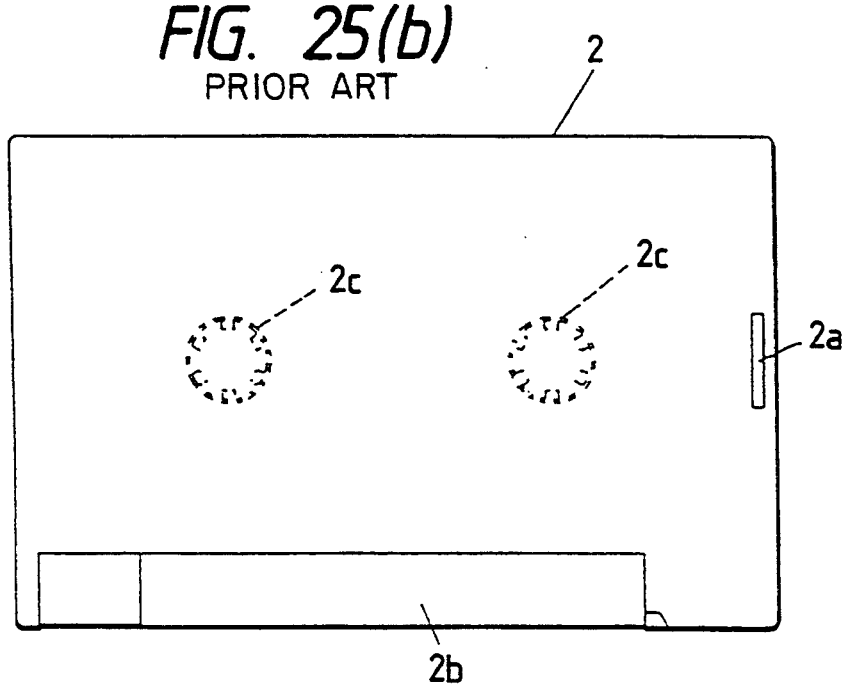

However, in accordance with this fourth embodiment, as best seen in FIG. 20(a) and 20(b), the urging member 11 always urges the second hook 4c so as to cause it not to disengage from the grip slot 2a. FIG. 20(a) shows an operational condition where the holder 3 is retracted to the right end, and FIG. 20(b) shows an operational condition where the holder 3 is lowered together with the guide member 7 along an arrow shown in FIG. 20(a).

Even in the lowering condition shown in FIG. 20(b), the urging member 11 can thus check the second hook 4c not to disengage from the grip slot 2a.

Thus, in accordance with the fourth embodiment, the tape cassette 1 or 2 can be firmly held during the transportation from the first position to the second position.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within the meets and bounds of the claims, or equivalents of such meets and bounds, are therefore intended to be embraced by the claims.

What is claimed is:

1. A tape recorder apparatus which is compatible with two different kinds of tape cassettes, each tape cassette housing a magnetic tape being wound around a pair of reels and having an upper surface formed with respective holes disposed to allow engagement of the reels, comprising:

a holder for selectively receiving a tape cassette of one of said two different kinds of tape cassettes;

a retainer member having a plurality of engaging hooks disposed along an insertion direction of said tape cassette, each of said engaging hooks exclusively engaging with one of the engaging holes formed in said tape cassette, said retainer member causing a swing movement for allowing said plurality of engaging hooks to engage with said tape cassette;

shift means, connected with said retainer member for transporting said tape cassette from a first position where the tape cassette is completely held in said holder to a second position where the tape cassette is set to execute its recording or reproducing operation;.

said retainer member including a shaft, which is secured to said shift means and disposed perpendicularly to the insertion direction of the tape cassette and also in parallel with the upper surface of the tape cassette, so that the retainer member is supported through said shaft at different pivotal positions according to kind of tape cassette selected; and said retainer member further including a protruding piece formed in parallel with said shaft of the retainer member, said protruding piece restricting the swing movement of said retainer member during transportation from said first position to said second position.

2. The tape recorder apparatus in accordance with claim 1, wherein:
said shift means includes a guide member which does not interfere with said protruding piece when the tape cassette is in said first position but interferes with said protruding piece in any position other than said first position, so as to only allow the protruding piece to shift along a shifting direction by the aid of said shift means without causing any swing movement.

3. The tape recorder apparatus in accordance with claim 2, wherein:
said protruding piece is restricted so as to not cause a swing movement by a lower surface of said guide member when a first kind of said two kinds of tape cassettes is loaded but is restricted so as to not cause a swing movement by an upper surface of said guide member when the other kind of said two kinds of tape cassettes is loaded.

4. The tape recorder apparatus in accordance with claim 1, wherein:
said retainer member has a pair of protruding pieces which extend in parallel with the shaft of the retainer member.

5. The tape recorder apparatus in accordance with claim 4, wherein:
each of said protruding pieces is made in a flat plate configuration which extends along an axial direction of the shaft of the retainer member.

6. The tape recorder apparatus in accordance with claim 5, wherein:
said plurality of engaging hooks a first hook and a second hook, and said protruding pieces are formed to cause a seesaw movement together with these first and second hooks about the shaft in a plane parallel to the insertion direction of the tape cassette.

7. The tape recorder apparatus in accordance with claim 1, wherein:
said protruding piece is associated with a guide member to restrict the swing movement of said retainer member at each of said pivotal positions of the retainer member.

8. A tape recorder apparatus in accordance with claim 7, wherein:
said protruding piece proceeds under said guide member when one of said two different kinds of cassettes is transported from said first position to said second position, and proceeds over said guide member when the other of said two different kinds of cassettes is transported from said first position to said second position.

* * * * *